United States Patent
Nakada et al.

(10) Patent No.: US 9,963,617 B2
(45) Date of Patent: May 8, 2018

(54) ACRYLIC PRESSURE-SENSITIVE ADHESIVE COMPOSITION AND PRESSURE-SENSITIVE ADHESIVE PRODUCTS

(71) Applicant: KURARAY CO., LTD., Kurashiki-shi (JP)

(72) Inventors: Kanayo Nakada, Tsukuba (JP); Yoshihiro Morishita, Tsukuba (JP); Shinya Oshita, Tsukuba (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days. days.

(21) Appl. No.: 14/395,893

(22) PCT Filed: Apr. 24, 2013

(86) PCT No.: PCT/JP2013/062745
§ 371 (c)(1),
(2) Date: Oct. 21, 2014

(87) PCT Pub. No.: WO2013/162056
PCT Pub. Date: Oct. 31, 2013

(65) Prior Publication Data
US 2015/0284596 A1 Oct. 8, 2015

Related U.S. Application Data

(60) Provisional application No. 61/640,945, filed on May 1, 2012.

(30) Foreign Application Priority Data

Apr. 27, 2012 (JP) .................... 2012-102813
Oct. 15, 2012 (JP) .................... 2012-227890

(51) Int. Cl.
| | | |
|---|---|---|
| *C09J 7/02* | (2006.01) | |
| *B32B 27/00* | (2006.01) | |
| *B32B 27/30* | (2006.01) | |
| *C09J 153/00* | (2006.01) | |
| *G09F 3/10* | (2006.01) | |
| *C08F 297/02* | (2006.01) | |

(52) U.S. Cl.
CPC ............. *C09J 7/0221* (2013.01); *B32B 27/00* (2013.01); *B32B 27/30* (2013.01); *C08F 297/026* (2013.01); *C09J 7/02* (2013.01); *C09J 153/00* (2013.01); *G09F 3/10* (2013.01); *C09J 2201/606* (2013.01); *C09J 2203/334* (2013.01); *C09J 2205/114* (2013.01); *C09J 2433/00* (2013.01); *C09J 2453/00* (2013.01); *Y10T 428/2891* (2015.01)

(58) Field of Classification Search
None
See application file for complete search history.

(56) References Cited

U.S. PATENT DOCUMENTS

| | | | |
|---|---|---|---|
| 5,098,959 A | 3/1992 | McGrath et al. | |
| 5,264,527 A | 11/1993 | Varshney et al. | |
| 6,329,480 B1 | 12/2001 | Uchiumi et al. | |
| 6,432,190 B1 * | 8/2002 | Scholz .................. | B41M 5/502 |
| | | | 106/287.11 |
| 7,714,052 B2 | 5/2010 | Paul et al. | |
| 9,683,148 B2 * | 6/2017 | Nakada .................. | C09J 153/00 |

(Continued)

FOREIGN PATENT DOCUMENTS

| | | |
|---|---|---|
| CN | 1989216 A | 6/2007 |
| EP | 2 716 728 A1 | 4/2014 |
| JP | 5-507737 A | 11/1993 |
| JP | 6-93060 A | 4/1994 |
| JP | 9-324165 A | 12/1997 |
| JP | 10-298248 A | 11/1998 |
| JP | 11-335432 A | 12/1999 |
| JP | 2002-533556 A | 10/2002 |
| JP | 2003-27036 A | 1/2003 |
| JP | 2004-26911 A | 1/2004 |
| JP | 2004-505166 A | 2/2004 |
| JP | 2009-249541 A | 10/2009 |

(Continued)

OTHER PUBLICATIONS

Moroishi, Yutaka et al., "Pressure-Sensitive Adhesive Composition and Its Manufacturing Method", English translation of JP2004-026911 A, Jan. 29, 2004.*

(Continued)

*Primary Examiner* — Anish Desai
(74) *Attorney, Agent, or Firm* — Oblon, McClelland, Maier & Neustadt, L.L.P.

(57) ABSTRACT

There are provided a pressure-sensitive adhesive composition which is excellent in durability, whitening resistance, hot-melt processability, pressure-sensitive adhesion properties, holding power at high temperatures, heat resistance, weathering resistance, compatibility with tackifying resins, low-temperature properties and transparency, is excellent also in balance of these properties and rarely suffers adhesion acceleration, and pressure-sensitive adhesive products using the pressure-sensitive adhesive composition. The pressure-sensitive adhesive composition comprises an acrylic block copolymer (I) having a polymer block (A) comprising methacrylic acid ester units and a polymer block (B) comprising acrylic acid ester units which are derived from an acrylic acid ester (1) represented by the general formula $CH_2=CH-COOR^1$ (1) (wherein $R^1$ is an organic group of 4 to 6 carbon atoms) and an acrylic acid ester (2) represented by the general formula $CH_2=CH-COOR^2$ (2) (wherein $R^2$ is an organic group of 7 to 12 carbon atoms), the mass ratio (1)/(2) of said acrylic acid ester (1) to said acrylic acid ester (2) being 65/35 to 20/80.

13 Claims, No Drawings

(56) References Cited

U.S. PATENT DOCUMENTS

| | | | |
|---|---|---|---|
| 2002/0015836 A1* | 2/2002 | Jonza | B32B 27/08 428/216 |
| 2004/0076844 A1* | 4/2004 | Tojo | B32B 17/10018 428/480 |
| 2005/0090592 A1* | 4/2005 | Husemann | C08F 293/005 524/322 |
| 2005/0234199 A1* | 10/2005 | Taniguchi | C08F 293/005 525/242 |
| 2006/0188712 A1* | 8/2006 | Okada | C08F 220/18 428/354 |
| 2009/0305068 A1* | 12/2009 | Morishita | C09J 9/02 428/483 |
| 2013/0079468 A1 | 3/2013 | Kanemura et al. | |
| 2013/0084417 A1 | 4/2013 | Takeda et al. | |
| 2013/0084418 A1 | 4/2013 | Takeda et al. | |
| 2014/0171591 A1 | 6/2014 | Matsumoto et al. | |
| 2015/0086781 A1* | 3/2015 | Chi | C09J 133/04 428/354 |
| 2015/0093569 A1* | 4/2015 | Chi | C09J 133/04 428/354 |

FOREIGN PATENT DOCUMENTS

| | | |
|---|---|---|
| JP | 2011-256319 A | 12/2011 |
| JP | 2011-256320 A | 12/2011 |
| TW | 201202385 | 1/2012 |
| WO | WO 00/39233 A1 | 7/2000 |
| WO | WO 02/10309 A1 | 2/2002 |
| WO | WO 2007/029783 A1 | 3/2007 |
| WO | WO 2008065982 A1 * | 6/2008 ............... C09J 9/02 |
| WO | WO 2012/165625 A1 | 12/2012 |

OTHER PUBLICATIONS

Sun Hee Park et al., "Effect of n-butyl acrylate/2-ethylhexyl acrylate weight ratio on the performances of waterborne core-shell PSAs", Journal of Industrial and Engineering Chemistry, 2017, vol. 53, pp. 111-118.*

International Search Report dated Aug. 6, 2013 in PCT/JP2013/062745.

Georges Moineau, et al., "Synthesis of fully acrylic thermoplastic elastomers by atom transfer radical polymerization (ATRP), $2^a$ Effect of the catalyst on the molecular control and the rheological properties of the triblock copolymers", Macromolecular Chemistry and Physics, vol. 201, No. 11, (2000), pp. 1108-1114.

Eric A. Grulke, "Solubility Parameter Values", Polymer Handbook Fourth Edition, VII, (1999), pp. 675-714.

Robert F. Fedors, "A Method for Estimating Both the Solubility Parameters and Molar Volumes of Liquids", Polymer Engineering and Science, vol. 14, No. 2, (Feb. 1974), pp. 147-154.

Extended European Search Report dated Jun. 5, 2015 in Patent Application No. 13780644.4.

Combined Office Action and Search Report dated Aug. 11, 2015 in Chinese Patent Application No. 201380021322.8 (with English translation and English translation of category of cited documents).

Office Action dated May 4, 2016 in Taiwanese Patent Application No. 102114577.

* cited by examiner

ACRYLIC PRESSURE-SENSITIVE ADHESIVE COMPOSITION AND PRESSURE-SENSITIVE ADHESIVE PRODUCTS

CROSS-REFERENCE TO RELATED APPLICATIONS

This application is a National Stage of PCT/JP2013/062745, which was filed on Apr. 24, 2013. PCT/JP2013/062745 claims the benefit of priority to U.S. Provisional Application No. 61/640,945, which was filed on May 1, 2012. This application is based upon and claims the benefit of priority to Japanese Application No. 2012-102813, which was filed on Apr. 27, 2012, and to Japanese Application No. 2012-227890, which was filed on Oct. 15, 2012.

BACKGROUND OF THE INVENTION

Technical Field

The present invention relates to a pressure-sensitive adhesive composition containing a specific acrylic block copolymer and pressure-sensitive adhesive products having a pressure-sensitive adhesive layer composed of the pressure-sensitive adhesive composition.

Background Art

As pressure-sensitive adhesives used for pressure-sensitive adhesive products each having a pressure-sensitive adhesive layer on at least a part of a surface of a base layer, such as pressure-sensitive adhesive sheets, pressure-sensitive adhesive films and pressure-sensitive adhesive tapes, solution type pressure-sensitive adhesives comprising base polymers, such as rubber-based pressure-sensitive adhesives and acrylic pressure-sensitive adhesives, have been frequently used in the past. In addition thereto, hot-melt type pressure-sensitive adhesives and aqueous emulsion type pressure-sensitive adhesives have been also used in recent years. Of these, acrylic pressure-sensitive adhesives have been widely used because they are excellent in transparency, weathering resistance and durability. As the acrylic pressure-sensitive adhesives, adhesives comprising acrylic block copolymers have been proposed from the viewpoints of coating properties and pressure-sensitive adhesion properties. For example, in a patent literature 1 and a patent literature 2, pressure-sensitive adhesives containing an acrylic block copolymer having excellent hot-melt processability and a tackifying resin have been proposed. In a patent literature 3, a pressure-sensitive adhesive using an acrylic block copolymer having a block composed of 2-ethylhexyl acrylate and having excellent holding power has been proposed. In patent literatures 4 and 5, pressure-sensitive adhesive sheets using an acrylic block copolymer as a base polymer and obtained by co-extrusion have been proposed.

The pressure-sensitive adhesives described in the patent literature 1 and the patent literature 2 had problems of insufficient cohesive force at high temperatures and insufficient durability such as insufficient holding power. The pressure-sensitive adhesive sheets of the patent literatures 3 and 4 were excellent in moldability in the co-extrusion process, but they had low adhesive force and sometimes had defects such as peeling in the durability test. In the patent literatures 1 to 4, a study of durability under the wet heat conditions was not made. The pressure-sensitive adhesive described in the patent literature 5 had excellent holding power, but there was room for improvement in adhesive force to glass.

With wide spreading of uses of the pressure-sensitive adhesives in recent years, much higher ability on the properties such as durability has been required, but satisfactory ability has not been obtained in the aforesaid pressure-sensitive adhesives containing acrylic block copolymers. With regard to pressure-sensitive adhesives satisfying also whitening resistance and low adhesion acceleration, a study has been hardly made, and it is difficult to satisfy the requirements in the prior art.

CITATION LIST

Patent Literature

Patent literature 1: U.S. Pat. No. 7,714,052
Patent literature 2: National Publication of International Patent No. 2002-533556
Patent literature 3: Japanese Patent Laid-Open Publication No. 2011-256319
Patent literature 4: Japanese Patent Laid-Open Publication No. 2011-256320
Patent literature 5: International Publication No. 2007/029783
Patent literature 6: Japanese Patent Laid-Open Publication No. 1994-93060
Patent literature 7: National Publication of International Patent No. 1993-507737
Patent literature 8: Japanese Patent Laid-Open Publication No. 1999-335432

Non Patent Literature

Non patent literature 1: "Macromolecular Chemistry and Physics", 2000; vol. 201, pp. 1108-1114

SUMMARY OF INVENTION

Technical Problem

Accordingly, it is an object of the present invention to provide a pressure-sensitive adhesive composition which is excellent in durability, whitening resistance, hot-melt processability, pressure-sensitive adhesion properties, holding power at high temperatures, heat resistance, weathering resistance, compatibility with tackifying resins, low-temperature properties and transparency, is excellent also in balance of these properties and rarely suffers adhesion acceleration, and pressure-sensitive adhesive products using the pressure-sensitive adhesive composition.

Solution to Problem

According to the present invention, the above object is achieved by providing the following.

[1] A pressure-sensitive adhesive composition comprising an acrylic block copolymer (I) in an amount of not less than 40% by mass based on the total amount of solid components of the pressure-sensitive adhesive composition, said acrylic block copolymer (I) having at least one polymer block (A) comprising methacrylic acid ester units and at least one polymer block (B) comprising acrylic acid ester units and having a weight-average molecular weight (Mw) of 30,000 to 300,000 and a molecular weight distribution (Mw/Mn) of 1.0 to 1.5, wherein the acrylic acid ester units to constitute the polymer block (B) are derived from an acrylic acid ester (1) represented by $CH_2=CH-COOR^1$ (1) (wherein $R^1$ is an organic group of 4 to 6 carbon atoms) and an acrylic acid ester (2) represented by $CH_2=CH-COOR^2$ (2) (wherein $R^2$ is an organic group of 7 to 12 carbon atoms), and the mass ratio (1)/(2) of the acrylic acid ester (1) to the acrylic acid ester (2) is 65/35 to 20/80.

[2] The pressure-sensitive adhesive composition of the above [1], wherein the content of the polymer block (A) in the acrylic block copolymer (I) is 5 to 95% by mass, and the content of the polymer block (B) therein is 95 to 5% by mass.

[3] The pressure-sensitive adhesive composition of the above [1] or [2], wherein the weight-average molecular weight (Mw) of the acrylic block copolymer (I) is 40,000 to 200,000.

[4] The pressure-sensitive adhesive composition of the above [1] or [2], wherein the weight-average molecular weight (Mw) of the acrylic block copolymer (I) is 30,000 to 80,000, and the pressure-sensitive adhesive composition is used by being thermally melted.

[5] The pressure-sensitive adhesive composition of the above [1] or [2], wherein the weight-average molecular weight (Mw) of the acrylic block copolymer (I) is 90,000 to 150,000.

[6] The pressure-sensitive adhesive composition of any one of the above [1] to [5], wherein the acrylic acid ester (1) is n-butyl acrylate.

[7] The pressure-sensitive adhesive composition of any one of the above [1] to [6], wherein the acrylic acid ester (2) is 2-ethylhexyl acrylate.

[8] The pressure-sensitive adhesive composition of any one of the above [1] to [7], wherein the tan δ value of viscoelasticity of the acrylic block copolymer (I), as measured at a frequency of 1 Hz, is $1\times10^{-2}$ to $1\times10^{-1}$ in the range of 50 to 100° C.

[9] The pressure-sensitive adhesive composition of any one of the above [1] to [8], wherein the 180° peel strength against a glass plate at a peel rate of 300 mm/min is not less than 10 N/25 mm, and when a structure of PET/pressure-sensitive adhesive layer/glass is subjected to aging in a constant temperature and humidity bath at 85° C. and 85% RH for 200 hours, a difference in haze value between before the aging and after the aging (10 minutes after it is taken out of the constant temperature and humidity bath) is not more than +2%.

[10] A laminate comprising a layer composed of the pressure-sensitive adhesive composition of any one of the above [1] to [9], said layer being laminated on at least one base layer.

[11] The laminate of the above [10], wherein the total light transmittance of the base layer is not less than 80%.

[12] A label having the laminate of the above [10] or [11].

[13] An optical pressure-sensitive adhesive sheet having a layer composed of the pressure-sensitive adhesive composition of any one of the above [1] to [9].

Advantageous Effects of Invention

According to the present invention, there can be provided a pressure-sensitive adhesive composition which is excellent in durability, whitening resistance, hot-melt processability, pressure-sensitive adhesion properties, holding power at high temperatures, heat resistance, weathering resistance, compatibility with tackifying resins, low-temperature properties and transparency, is excellent also in balance of these properties and rarely suffers adhesion acceleration, and pressure-sensitive adhesive products using the pressure-sensitive adhesive composition.

DESCRIPTION OF EMBODIMENTS

The present invention is described below in detail. In the present invention, "(meth)acrylic acid ester" is a general term of "methacrylic acid ester" and "acrylic acid ester", and "(meth)acrylic" is a general term of "methacrylic" and "acrylic". In the present invention, further, the term "transparency" indicates that the total light transmittance is not less than 80%. The wavelength in the measurement of the total light transmittance can be properly determined in the range of visible light (360 to 730 nm).

The acrylic block copolymer (I) for use in the present invention has at least one polymer block (A) comprising methacrylic acid ester units and at least one polymer block (B) comprising acrylic acid ester units, and is composed of an acrylic acid ester (1) represented by the general formula $CH_2=CH-COOR^1$ (1) (wherein $R^1$ is an organic group of 4 to 6 carbon atoms) and an acrylic acid ester (2) represented by the general formula $CH_2=CH-COOR^2$ (2) (wherein $R^2$ is an organic group of 7 to 12 carbon atoms), and the mass ratio (1)/(2) of the acrylic acid ester (1) to the acrylic acid ester (2) is 65/35 to 20/80.

The weight-average molecular weight (Mw) of the whole of the acrylic block copolymer (I) for use in the present invention is 30,000 to 300,000. From the viewpoint that the pressure-sensitive adhesive composition is easily produced, the weight-average molecular weight is preferably 40,000 to 200,000, more preferably 50,000 to 180,000, still more preferably 60,000 to 150,000. From the viewpoint that the adhesive force to metals such as SUS is increased, the weight-average molecular weight (Mw) is particularly preferably 90,000 to 150,000.

When the pressure-sensitive adhesive composition of the present invention is used by being thermally melted through a hot-melt coating method, a T-die method, an inflation method, a calendering method, a lamination method or the like, the weight-average molecular weight (Mw) of the whole of the acrylic block copolymer (I) is preferably 30,000 to 150,000, more preferably 35,000 to 100,000, from the viewpoint of productivity in coating or film processing. From the viewpoint that the viscosity behavior in extrusion or the like is stable and from the viewpoint that the pressure-sensitive adhesive composition has low viscosity and excellent coating properties in the hot-melt coating process, the weight-average molecular weight (Mw) is particularly preferably 40,000 to 80,000.

The ratio (Mw/Mn) of the weight-average molecular weight (Mw) of the whole of the acrylic block copolymer (I) for use in the present invention to the number-average molecular weight (Mn) thereof is 1.0 to 1.5. From the viewpoint that the cohesive force of the resulting pressure-sensitive adhesive composition at high temperatures is high, the ratio is preferably 1.0 to 1.4, more preferably 1.0 to 1.3.

The content of the polymer block (A) in the acrylic block copolymer (I) for use in the present invention is preferably 5 to 95% by mass, and the content of the polymer block (B) therein is preferably 95 to 5% by mass. From the viewpoints that the resulting pressure-sensitive adhesive composition has excellent pressure-sensitive adhesion properties and it becomes possible to supply a block copolymer or a pressure-sensitive adhesive composition using the copolymer, in easily handleable forms (e.g., pellets), it is preferable that the content of the polymer block (A) is 15 to 60% by mass and the content of the polymer block (B) is 85 to 40% by mass; it is more preferable that the content of the polymer block (A) is 18 to 60% by mass and the content of the polymer block (B) is 82 to 40% by mass; it is still more preferable that the content of the polymer block (A) is 22 to 50% by mass and the content of the polymer block (B) is 78 to 50% by mass; it is particularly preferable that the content of the polymer block (A) is 22 to 40% by mass and the content of the polymer block (B) is 78 to 60% by mass; and it is most preferable that the content of the polymer block (A) is 25 to 40% by mass and the content of the polymer block (B) is 75 to 60% by mass. When the content of the polymer block (B) is 85 to 40% by mass, there is an advantage that whitening rarely occurs after storage under the wet heat conditions. If the content of the polymer block (B) is more than 78% by mass, the block copolymer becomes veil-like, and handling of the block copolymer or handling thereof in the production of a pressure-sensitive adhesive using it sometimes becomes difficult. When the contents of the polymer blocks (A) and (B) satisfy the above requirements, the tan δ value of viscoelasticity, as measured at a frequency of 1 Hz, tends to be in the range of $1 \times 10^{-2}$ to $1 \times 10^{-1}$ at 50 to 100° C., and as a result, a pressure-sensitive adhesive rarely suffering adhesion acceleration is obtained, so that such contents are preferable.

When the polymer block (A) is designated by "A" and the polymer block (B) is designated by "B", the acrylic block copolymer (I) is preferably represented by any of the general formulas:

(A-B)$n$ (A-B)$n$-A

B-(A-B)$n$ (A-B)$n$—Z (B-A)$n$—Z wherein n represents an integer of 1 to 30, and Z represents a coupling site (coupling site after coupling agent reacts with polymer end to form chemical bond). When the polymer block (B) comprises two or more acrylic acid ester units, the polymer block (B) may be composed of a random copolymer of acrylic acid ester units constituting the polymer block (B), or may be composed of a block copolymer of the acrylic acid ester units, or may be composed of a tapered block copolymer of the acrylic acid ester units. The value of n is preferably 1 to 15, more preferably 1 to 8, still more preferably 1 to 4. Of the copolymers of the above structures, a linear block copolymer represented by (A-B)n, (A-B)n-A or B-(A-B)n is preferable.

Examples of the methacrylic acid esters that are constitutional units of the polymer block (A) include methacrylic acid esters having no functional group, such as methyl methacrylate, ethyl methacrylate, isopropylmethacrylate, n-propylmethacrylate, n-butylmethacrylate, isobutyl methacrylate, sec-butyl methacrylate, tert-butyl methacrylate, n-hexyl methacrylate, cyclohexyl methacrylate, 2-ethylhexylmethacrylate, n-octylmethacrylate, laurylmethacrylate, tridecylmethacrylate, stearylmethacrylate, isobornylmethacrylate, phenyl methacrylate and benzyl methacrylate; and methacrylic acid esters having a functional group, such as methoxyethyl methacrylate, ethoxyethyl methacrylate, diethylaminoethyl methacrylate, 2-hydroxyethyl methacrylate, 2-aminoethyl methacrylate, glycidyl methacrylate and tetrahydrofurfuryl methacrylate.

Of these, preferable are methacrylic acid esters having no functional group, more preferable are methyl methacrylate, ethyl methacrylate, tert-butyl methacrylate, cyclohexyl methacrylate, isobornyl methacrylate and phenyl methacrylate, and still more preferable is methyl methacrylate, from the viewpoint of improvement in transparency, heat resistance and durability of the resulting pressure-sensitive adhesive composition. In the case of methyl methacrylate, phase separation between the polymer block (A) and the polymer block (B) becomes clearer, and therefore, the resulting pressure-sensitive adhesive composition exhibits particularly high cohesive force, so that methyl methacrylate is more preferable. The polymer block (A) may be composed of one of these methacrylic acid esters, or may be composed of two or more of them. In the acrylic block copolymer (I), two or more polymer blocks (A) are preferably contained from the viewpoint of increase in durability. In this case, those polymer blocks (A) may be the same or different.

The weight-average molecular weight (Mw) of the polymer block (A) is not specifically restricted, but it is preferably in the range of 1,000 to 50,000, more preferably 4,000 to 20,000. If the weight-average molecular weight (Mw) of the polymer block (A) is less than the lower limit of the above range, there is a problem of insufficient cohesive force of the resulting acrylic block copolymer (I). If the weight-average molecular weight (Mw) of the polymer block (A) is more than the upper limit of the above range, melt viscosity of the resulting acrylic block copolymer (I) is increased, and productivity or moldability of the acrylic block copolymer (I) is sometimes deteriorated. The proportion of the methacrylic acid ester units contained in the polymer block (A) is preferably not less than 60% by mass, more preferably not less than 80% by mass, still more preferably not less than 90% by mass, in the polymer block (A).

The acrylic acid ester units to constitute the polymer block (B) are derived from an acrylic acid ester (1) and an acrylic acid ester (2).

Examples of the acrylic acid esters (1) include acrylic acid esters having no functional group, such as n-butyl acrylate, isobutyl acrylate, sec-butyl acrylate, tert-butyl acrylate, amyl acrylate, isoamyl acrylate, n-hexyl acrylate, cyclohexyl acrylate and phenyl acrylate; and acrylic acid esters having a functional group, such as methoxyethyl acrylate, ethoxyethyl acrylate, diethylaminoethyl acrylate, 2-hydroxyethyl acrylate, 2-aminoethyl acrylate, glycidyl acrylate and tetrahydrofurfuryl acrylate.

Of these, preferable are acrylic acid esters having no functional group, and more preferable are acrylic acid esters such as n-butyl acrylate and n-hexyl acrylate, from the viewpoint that transparency, flexibility, cold resistance and low-temperature properties of the resulting pressure-sensitive adhesive composition are improved. These may be used singly, or may be used in combination of two or more kinds.

Examples of the acrylic acid esters (2) include 2-ethylhexyl acrylate, n-octyl acrylate, isooctyl acrylate, decyl acrylate, isobornyl acrylate, lauryl acrylate, benzyl acrylate and phenoxyethyl acrylate.

Of these, preferable are acrylic acid esters, such as 2-ethylhexyl acrylate, n-octyl acrylate, isooctyl acrylate, lauryl acrylate and phenoxyethyl acrylate, from the viewpoint that transparency, flexibility, cold resistance and low-temperature properties of the resulting pressure-sensitive adhesive composition are improved. From the viewpoint that the resulting pressure-sensitive adhesive composition has excellent pressure-sensitive adhesion properties (tack, adhesive force, etc.) at low temperatures (10 to −40° C.) and exhibits stable adhesive force under a wide range of peel rate conditions, 2-ethylhexyl acrylate, n-octyl acrylate and isooctyl acrylate are more preferable. In the case of 2-ethylhexyl acrylate, phase separation between the polymer block (A) and the polymer block (B) becomes clearer, and therefore, the resulting pressure-sensitive adhesive composition exhibits particularly high cohesive force, so that 2-ethylhexyl acrylate is particularly preferable. These may be used singly, or may be used in combination of two or more kinds.

In the polymer block (B), the mass ratio (1)/(2) of the acrylic acid ester (1) to the acrylic acid ester (2) is 65/35 to 20/80. When the mass ratio is in the above range, whitening resistance and pressure-sensitive adhesion properties are compatible with each other, and moreover, compatibility with tackifying resins is enhanced. When the mass ratio of the acrylic acid ester (1) to the acrylic acid ester (2) is in the above range, the tan δ value of viscoelasticity, as measured at a frequency of 1 Hz, tends to be in the range of $1\times10^{-2}$ to $1\times10^{-1}$ at 50 to 100° C., and as a result, a pressure-sensitive adhesive rarely suffering adhesion acceleration is obtained. The mass ratio (1)/(2) of the acrylic acid esters is preferably 55/45 to 30/70, more preferably 55/45 to 40/60. The mass ratio of the acrylic acid ester (1) to the acrylic acid ester (2) is determined by the method described in the later-described working examples.

Examples of combinations of the acrylic acid esters used for the polymer block (B) include n-butyl acrylate/2-ethylhexyl acrylate, n-butyl acrylate/octyl acrylate, n-hexyl acrylate/2-ethylhexyl acrylate, n-butyl acrylate/lauryl acrylate, n-butyl acrylate/benzyl acrylate, and n-butyl acrylate/[2-ethylhexyl acrylate/lauryl acrylate]. The acrylic acid ester (1) and the acrylic acid ester (2) used herein are more preferably an acrylic acid ester (1) and an acrylic acid ester (2) having a difference in solubility parameter between them ranging from 1.0 to 2.5 $(MPa)^{1/2}$. The solubility parameter referred to in the present invention can be calculated by the method described in "POLYMER HANDBOOK Fourth Edition", VII, pp. 675-714 (Wiley Interscience, ed. in 1999) and "Polymer Engineering and Science", 1974, vol. 14, pp. 147-154. When two or more polymer blocks (B) are contained in the acrylic block copolymer (I), combinations of the acrylic acid ester units to constitute the polymer blocks (B) may be the same or different.

The polymer block (B) may be composed of a random copolymer of the acrylic acid ester (1) and the acrylic acid ester (2) that constitute the polymer block (B), or may be composed of a block copolymer of the acrylic acid esters, or may be composed of a tapered block copolymer of the acrylic acid esters. When two or more polymer blocks (B) are contained in the acrylic block copolymer (I), the structures of those polymer blocks (B) may be the same or different. The proportion of the acrylic acid ester units contained in the polymer block (B) is preferably not less than 60% by mass, more preferably not less than 80% by mass, still more preferably not less than 90% by mass, in the polymer block (B).

In the polymer block (A) and the polymer block (B), the components of one block may be contained in the other block within limits not detrimental to the effect of the present invention. Further, other monomers may be contained, if necessary. Examples of other monomers include vinyl-based monomers having a carboxyl group, such as (meth)acrylic acid, crotonic acid, maleic acid, maleic anhydride, fumaric acid and (meth)acrylamide; vinyl-based monomers having a functional group, such as (meth)acrylonitrile, vinyl acetate, vinyl chloride and vinylidene chloride; aromatic vinyl-based monomers, such as styrene, α-methylstyrene, p-methylstyrene and m-methylstyrene; conjugated diene-based monomers, such as butadiene and isoprene; olefin-based monomers such as ethylene, propylene, isobutene and octene; and lactone-based monomers, such as ε-caprolactone and valerolactone. When these monomers are used, they are usually used in a small amount, and they are preferably used in an amount of not more than 40% by mass, more preferably not more than 20% by mass, based on the total amount by mass of the monomers used for each polymer block.

The acrylic block copolymer (I) for use in the present invention may have other polymer blocks in addition to the polymer block (A) and the polymer block (B), if necessary. Examples of other polymer blocks include polymer blocks or copolymer blocks composed of styrene, α-methylstyrene, p-methylstyrene, m-methylstyrene, acrylonitrile, methacrylonitrile, ethylene, propylene, isobutene, butadiene, isoprene, octane, vinyl acetate, maleic anhydride, vinyl chloride and vinylidene chloride; and polymer blocks composed of polyethylene terephthalate, polylactic acid, polyurethane and polydimethylsiloxane. In the polymer blocks, hydrogenation products of polymer blocks containing conjugated diene compounds such as butadiene and isoprene are also included.

The production process for the acrylic block copolymer (I) for use in the present invention is not specifically restricted as far as a polymer satisfying the conditions of the present invention regarding the chemical structure is obtained, and processes based on publicly known techniques are adoptable. As a process for obtaining a block copolymer having a narrow molecular weight distribution, a process comprising living-polymerizing monomers that are constitutional units is generally adopted. Examples of such processes comprising living polymerization include a process wherein living polymerization is performed using an organic rare earth metal complex as a polymerization initiator (see patent literature 6), a process wherein living anionic polymerization is performed using an organic alkaline metal compound as a polymerization initiator in the presence of a mineral acid salt such as a salt of an alkaline metal or an alkaline earth metal (see patent literature 7), a process wherein living anionic polymerization is performed using an organic alkaline metal compound as a polymerization initiator in the presence of an organoaluminum compound (see patent literature 8), and an atomic transfer radical polymerization process (ATRP) (see non patent literature 1).

In the process wherein living anionic polymerization is performed using an organic alkaline metal compound as a polymerization initiator in the presence of an organoaluminum compound among the above production processes, the resulting block copolymer has high transparency, the amount of residual monomers is small, the odor is inhibited, and when the resulting copolymer is used for a pressure-sensitive adhesive composition, occurrence of bubbles after lamination can be inhibited, so that such a process is preferable. Further, such a process is preferable also from the viewpoints that the molecular structure of the methacrylic acid ester polymer block becomes highly syndiotactic, and this contributes to enhancement of durability of the pressure-sensitive adhesive composition, and in the case of industrial production, the environmental burden (electrical power necessary for refrigerator for mainly controlling polymerization temperature) is small because living polymerization under relatively mild temperature conditions is possible.

The organoaluminum compound is, for example, an organoaluminum compound represented by the following general formula (3):

$$AlR^3R^4R^5 \tag{3}$$

wherein $R^3$, $R^4$ and $R^5$ are each independently an alkyl group which may have a substituent, a cycloalkyl group which may have a substituent, an aryl group which may have a substituent, an aralkyl group which may have a substituent, an alkoxyl group which may have a substituent, an aryloxy group which may have a substituent or an N,N-disubstituted amino group; or $R^3$ is any one group of the above groups, and $R^4$ and $R^5$ together form an arylenedioxy group which may have a substituent.

As the organoaluminum compounds represented by the general formula (3), isobutylbis(2,6-di-tert-butyl-4-methylphenoxy)aluminum, isobutylbis(2,6-di-tert-butylphenoxy)aluminum, isobutyl[2,2'-methylenebis(4-methyl-6-tert-butylphenoxy)]aluminum, etc. can be preferably mentioned from the viewpoints of high living properties in the polymerization, ease of handling, etc.

Examples of the organic alkaline metal compounds include alkyllithiums and alkyldilithiums, such as n-butyllithium, sec-butyllithium, isobutyllithium, tert-butyllithium, n-pentyllithium and tetramethylenedilithium; aryllithiums and aryldilithiums, such as phenyllithium, p-tolyllithium and lithium naphthalene; aralkyllithiums and aralkyldilithiums, such as benzyllithium, diphenylmethyllithium and dilithium formed by the reaction of diisopropenylbenzene with butyllithium; lithium amides, such as lithium dimethylamide; and lithium alkoxides, such as methoxylithium and ethoxylithium. These may be used singly, or may be used in combination of two or more kinds. From the viewpoint of high polymerization initiation efficiency, alkyllithiums are preferable among them, and of these, tert-butyllithium and sec-butyllithium are more preferable, and sec-butyllithium is still more preferable.

The living anionic polymerization is usually carried out in the presence of a solvent that is inert to the polymerization reaction. Examples of the solvents include aromatic hydrocarbons, such as benzene, toluene and xylene; halogenated hydrocarbons, such as chloroform, methylene chloride and carbon tetrachloride; and ethers, such as tetrahydrofuran and diethyl ether.

A block copolymer can be produced by, for example, repeating a step of forming a desired polymer block (polymer block (A), polymer block (B) or the like) at an end of a desired living polymer obtained by polymerizing a monomer, a desired number of times, and then terminating the polymerization reaction. Specifically, the acrylic block copolymer (I) can be produced by, for example, carrying out plural polymerization steps including a first step of polymerizing a monomer to form a first polymer block, a second step of polymerizing a monomer to form a second polymer block, and if necessary, a third step of polymerizing a monomer to form a third polymer block, said each step being carried out using a polymerization initiator comprising an organic alkaline metal compound in the presence of an organoaluminum compound, and then allowing the active end of the resulting polymer to react with an alcohol or the like to terminate the polymerization reaction. According to such a process as above, a block bipolymer (diblock copolymer) consisting of polymer block (A)-polymer block (B), a block terpolymer (triblock copolymer) consisting of polymer block (A)-polymer block (B)-polymer block (A), a block quaterpolymer consisting of polymer block (A)-polymer block (B)-polymer block (A)-polymer block (B), etc. can be produced.

In the formation of the polymer block (A), the polymerization temperature is preferably 0 to 100° C., and in the formation of the polymer block (B), the polymerization temperature is preferably −50 to 50° C. If the polymerization temperature is lower than the lower limit of the above range, progress of the reaction becomes slow, and a long time is required for completion of the reaction. On the other hand, if the polymerization temperature is higher than the upper limit of the above range, deactivation of the living polymer end is increased, and as a result, the molecular weight distribution is widened or a desired block copolymer is not obtained. The polymer block (A) and the polymer block (B) can be each formed by polymerization in 1 second to 20 hours.

In the pressure-sensitive adhesive composition of the present invention, other polymers and additives, such as tackifying resin, softener, plasticizer, heat stabilizer, light stabilizer, antistatic agent, flame retardant, blowing agent, colorant, dye, refractive index adjusting agent, filler and curing agent, may be contained. These other polymers and additives may be contained singly, or may be contained in combination of two or more kinds.

Examples of other polymers include acrylic resins, such as poly(methyl methacrylate) and (meth)acrylic acid ester copolymers; olefin-based resins, such as polyethylene, ethylene/vinyl acetate copolymer, polypropylene, polybutene-1, poly-4-methylpentene-1 and polynorbornene; ethylene-based ionomers; styrene-based resins, such as polystyrene, styrene/maleic anhydride copolymer, high impact polystyrene, AS resin, ABS resin, AES resin, AAS resin, ACS resin and MBS resin; styrene/methyl methacrylate copolymer; polyester resins, such as polyethylene terephthalate, polybutylene terephthalate and polylactic acid; polyamides, such as nylon 6, nylon 66 and polyamide elastomer; polycarbonate; polyvinyl chloride; polyvinylidene chloride; polyvinyl alcohol; ethylene/vinyl alcohol copolymer; polyacetal; polvinylidene fluoride; polyurethane; modified polyphenylene ether; polyphenylene sulfide; silicone rubber modified resins; acrylic rubbers; silicone-based rubbers; styrene-based thermoplastic elastomers, such as SEPS, SEBS and SIS; and olefin-based rubbers, such as IR, EPR and EPDM. Of these, acrylic resins, ethylene/vinyl acetate copolymer, AS resin, polylactic acid and polyvinylidene fluoride are preferable, and (meth)acrylic acid ester copolymers are more preferable, from the viewpoint of compatibility with the acrylic block copolymer (I) contained in the pressure-sensitive adhesive composition.

As the (meth)acrylic acid ester copolymers, a diblock copolymer and a triblock copolymer, each of which is composed of at least one polymer block (A) comprising methacrylic acid ester units and at least one polymer block (B) comprising acrylic acid ester units, are preferable (These diblock copolymers and triblock copolymers do not include the acrylic block copolymer (I) of the present invention).

The pressure-sensitive adhesive composition of the present invention preferably contains a tackifying resin because control of tack, adhesive force and holding power becomes easy. Examples of the tackifying resins include natural resins, such as rosin-based resins and terpene-based resins; and synthetic resins, such as petroleum resins, hydrogen-added (sometimes referred to as "hydrogenated" hereinafter) petroleum resins, styrene-based resins, coumarone-indene-based resins, phenolic resins and xylene resins. When the tackifying resin is incorporated, the content thereof is preferably 1 to 100 parts by mass, more preferably 3 to 70 parts by mass, still more preferably 5 to 50 parts by mass, particularly preferably 5 to 40 parts by mass, most preferably 5 to 35 parts by mass, based on 100 parts by mass of the acrylic block copolymer (I), from the viewpoints of adhesive force and durability.

Examples of the rosin-based resins include rosins, such as gum rosin, tall oil rosin and wood rosin; modified rosins, such as hydrogenated rosin, disproportionated rosin and polymerized rosin; and rosin esters, such as glycerol esters and pentaerythritol esters of these rosins and modified rosins. Specific examples of the rosins include Pinecrystal KE-100, Pinecrystal KE-311, Pinecrystal KE-359, Pinecrystal KE-604 and Pinecrystal D-6250 (each manufactured by Arakawa Chemical Industries, Ltd.)

Examples of the terpene-based resins include terpene resins having α-pinene, β-piene, dipentene or the like as a main body, aromatic modified terpene resins, hydrogenated terpene resins and terpene phenol resins: Specific examples of the terpene-based resins include Tamanol 901 (manufactured by Arakawa Chemical Industries, Ltd.). Examples of the (hydrogenated) petroleum resins include (hydrogenated) aliphatic ($C_5$ type) petroleum resins, (hydrogenated) aromatic ($C_9$ type) petroleum resins, (hydrogenated) copolymer-based ($C_5/C_9$ type) petroleum resins, (hydrogenated) dicyclopentadiene-based petroleum resins and alicyclic saturated hydrocarbon resins. Examples of the styrene-based resins include poly-α-methylstyrene, α-methylstyrene/styrene copolymer, styrene-based monomer/aliphatic monomer copolymer, styrene-based monomer/α-methylstyrene/aliphatic monomer copolymer, styrene-based monomer copolymer, and styrene-based monomer/aromatic monomer copolymer. Specific examples of the styrene-based resins include FTR6000 series and FTR7000 series (manufactured by Mitsui Chemicals, Inc.).

Of the above tackifying resins, rosin-based resins, terpene-based resins, (hydrogenated) petroleum resins and styrene-based resins are preferable from the viewpoint of appearance of high adhesive force, and of these, rosins are preferable from the viewpoint that adhesion properties are enhanced. From the viewpoints of resistance to photo-deterioration and inhibition of coloration and occurrence of bubbles caused by impurities, disproportionated or hydrogenated rosins having been purified by operations such as distillation, recrystallization and extraction are more preferable. These may be used singly, or may be used in combination of two or more kinds. The softening point of the tackifying resin is preferably 50 to 150° C. from the viewpoint of appearance of high adhesive force.

Examples of the plasticizers include fatty acid esters, e.g., phthalic acid esters, such as dibutyl phthalate, di-n-octyl phthalate, bis-2-ethylhexyl phthalate, di-n-decyl phthalate and diisodecyl phthalate, sebacic acid esters, such as bis-2-ethylhexyl sebacate and di-n-butyl sebacate, azelaic acid esters, such as bis-2-ethylhexyl azelate and adipic acid esters, such as bis-2-ethylhexyl adipate and di-n-octyl adipate; paraffins, such as chlorinated paraffin; glycols, such as polypropylene glycol; epoxy-based high-molecular plasticizers, such as epoxidized soybean oil and epoxidized linseed oil; phosphoric acid esters, such as trioctyl phosphate and triphenyl phosphate; phosphorous acid esters, such as triphenyl phosphite; acrylic oligomers, such as poly(n-butyl (meth)acrylate) and poly(2-ethylhexyl(meth)acrylate); polybutene; polyisobutylene; polyisoprene; process oil; and naphthenic oil. These may be used singly, or may be used in combination of two or more kinds.

Examples of the fillers include inorganic fibers, such as glass fiber and carbon fiber; organic fibers; and inorganic fillers, such as calcium carbonate, talc, carbon black, titanium oxide, silica, clay, barium sulfate and magnesium carbonate. When the inorganic fibers or the organic fibers are contained, durability is imparted to the resulting pressure-sensitive adhesive composition. When the inorganic fillers are contained, heat resistance and weathering resistance are imparted to the resulting pressure-sensitive adhesive composition.

When the pressure-sensitive adhesive composition is used together with a curing agent, the composition can be preferably used as an UV curing type pressure-sensitive adhesive. As the curing agents, photo-curing agents such as UV curing agents, and thermal curing agents can be mentioned, and for example, benzoins, benzoin ethers, benzophenones, anthraquinones, benzyls, acetophenones and diacetyls can be mentioned. Specific examples thereof include benzoin, α-methylolbenzoin, α-t-butylbenzoin, benzoin methyl ether, benzoin ethyl ether, benzoin n-propyl ether, benzoin isopropyl ether, benzoin isobutyl ether, α-methylolbenzoin methyl ether, α-methoxybenzoin methyl ether, benzoin phenyl ether, benzophenone, 9,10-anthraquinone, 2-ethyl-9,10-anthraquinone, benzyl, 2,2-dimethoxy-1,2-diphenylethan-1-one (2,2-dimethoxy-2-phenylacetophenone) and diacetyl. The curing agents may be used singly, or may be used in combination of two or more kinds.

From the viewpoint of increase in effects of the curing agent, there may be further added, for example, monomers, specifically, acrylic acid, methacrylic acid, α-cyanoacrylic acid, α-halogenated acrylic acid, crotonic acid, cinnamic acid, sorbic acid, maleic acid, itaconic acid, esters, such as acrylic acid ester, methacrylic acid ester, crotonic acid ester and malic acid ester, acrylamide, methacrylamide, acrylamide derivatives, such as N-methylolacrylamide, N-hydroxyethylacrylamide and N,N-(dihydroxyethyl) acrylamide, methacrylamide derivatives, such as N-methylolmethacrylamide, N-hydroxyethylmethacrylamide and N,N-(dihydroxyethyl)methacrylamide, vinyl ester, vinyl ether, mono-N-vinyl derivatives, and styrene derivatives; and oligomers containing the above monomers as constituents. From the viewpoint of increase in durability, preferable are esters, such as acrylic acid ester, methacrylic acid ester, crotonic acid ester and maleic acid ester; vinyl ether; styrene derivatives; and oligomers containing the above monomers as constituents. In addition to these monomers, crosslinking agents comprising bifunctional or higher functional monomers or oligomers may be further added.

The production process for the pressure-sensitive adhesive composition of the present invention is not specifically restricted, and the composition can be produced by, for example, mixing the components using a known mixing or kneading device, such as kneader-ruder, extruder, mixing roll or Banbury mixer, usually at a temperature of 100° C. to 250° C. The pressure-sensitive adhesive composition may be produced by dissolving each component in an organic solvent, mixing the solutions and then removing the organic solvent. The resulting pressure-sensitive adhesive composition can be used by being thermally melted, or it may be used as a solution type pressure-sensitive adhesive by dissolving it in a solvent. Examples of the solvents include toluene, ethyl acetate, ethylbenzene, methylene chloride, chloroform, tetrahydrofuran, methyl ethyl ketone, dimethyl sulfoxide and a toluene-ethanol mixed solvent. Of these, toluene, ethylbenzene, ethyl acetate and methyl ethyl ketone are preferable.

When the pressure-sensitive adhesive composition of the present invention is used by being thermally melted, the melt viscosity is preferably low from the viewpoints of processability and handleability, and for example, when the composition is subjected to holt-melt processing, the melt viscosity at about 200° C. is preferably not more than 50,000 mPa·s, more preferably not more than 30,000 mPa·s.

The pressure-sensitive adhesive composition of the present invention is favorably used for a pressure-sensitive adhesive layer composed of the pressure-sensitive adhesive composition or a pressure-sensitive adhesive product in the form of a laminate containing the pressure-sensitive adhesive layer.

When the pressure-sensitive adhesive layer is formed by thermal melting of the pressure-sensitive adhesive composition of the present invention, the composition can be processed into a sheet, a film or the like using, for example, a hot-melt coating method, a T-die method, an inflation method, a calendering method, a lamination method or the like. When the pressure-sensitive adhesive composition of the present invention is used by dissolving it in a solvent, the pressure-sensitive adhesive layer can be formed by a method in which a flat plate or a roll of a steel belt or a heat-resistant material such as polyethylene terephthalate, is used as a substrate, and a solution obtained by dissolving the acrylic block copolymer (I) or the composition containing the acrylic block copolymer (I) in a solvent is applied onto the substrate using a bar coater, a roll coater, a die coater, a comma coater or the like and then dried to remove the solvent.

The method to remove the solvent by drying is not specifically restricted, and a hitherto publicly known method can be used, but it is preferable to carry out drying in plural stages. When drying is carried out in plural stages, it is more preferable that the drying in the first stage is carried out at a relatively low temperature in order to inhibit expansion due to rapid evaporation of the solvent, and the drying in the second stage and thereafter is carried out at a high temperature in order to sufficiently remove the solvent.

The concentration of the acrylic block copolymer (I) or the composition containing the acrylic block copolymer (I) in the solution is properly determined taking into consideration the solubility of the acrylic block copolymer (I) or the composition containing the acrylic block copolymer (I) in the solvent, the viscosity of the resulting solution, etc. However, a preferred lower limit is 5% by mass, and a preferred upper limit is 55% by mass.

The laminate is obtained by laminating a pressure-sensitive adhesive layer composed of the pressure-sensitive adhesive composition of the present invention onto any of various bases, such as paper, cellophane, plastic materials, cloth, wood and metals. When the base layer is composed of a transparent material, a transparent laminate is obtained because the pressure-sensitive adhesive composition of the present invention is excellent in transparency and weathering resistance, so that such a base layer is preferable. Example of the base layers composed of transparent materials include base layers composed of a polymer, such as polyethylene terephthalate, triacetyl cellulose, polyvinyl alcohol, cycloolefin-based resin, styrene/methyl methacrylate copolymer, polypropylene, polyethylene, polyvinyl chloride, ethylene/vinyl acetate copolymer, polycarbonate, poly(methyl methacrylate), polyethylene or polypropylene, mixtures of two or more of these polymers, and glasses, without limiting thereto. The said polymer can be a copolymer further comprising unit derived from various monomers.

Examples of structures of the laminates include a 2-layer structure of a pressure-sensitive adhesive layer composed of the pressure-sensitive adhesive composition of the present invention and a base layer, a 3-layer structure of two base layers and a pressure-sensitive adhesive layer composed of the pressure-sensitive adhesive composition of the present invention (base layer/pressure-sensitive adhesive layer/base layer), a 4-layer structure of a base layer, two different pressure-sensitive adhesive layers (a) and (b) composed of the pressure-sensitive adhesive compositions of the present invention and a base layer (base layer/pressure-sensitive adhesive layer (a)/pressure-sensitive adhesive layer (b)/base layer), a 4-layer structure of a base layer, a pressure-sensitive adhesive layer (a) composed of the pressure-sensitive adhesive composition of the present invention, a pressure-sensitive adhesive layer (c) composed of another material and a base layer (base layer/pressure-sensitive adhesive layer (a)/pressure-sensitive adhesive layer (c)/base layer), and a 5-layer structure of three base layers and two pressure-sensitive adhesive layers composed of the pressure-sensitive adhesive composition of the present invention (base layer/pressure-sensitive adhesive layer/base layer/pressure-sensitive adhesive layer/base layer), without limiting thereto.

Although the thickness ratio in the laminate is not specifically restricted, the thickness ratio (base layer/pressure-sensitive adhesive layer) is preferably in the range of 1/1000 to 1000/1, more preferably 1/200 to 200/1, from the viewpoints of pressure-sensitive adhesion properties, durability and handleability of the resulting pressure-sensitive adhesive products.

For producing the laminate, a pressure-sensitive adhesive layer and a base layer separately formed may be laminated together by a lamination method or the like, or a pressure-sensitive adhesive layer may be directly formed on a base layer, or a pressure-sensitive adhesive layer and a base layer may be co-extruded to form a layer structure at a time.

In order to increase adhesive force between the base layer and the pressure-sensitive adhesive layer in the laminate of the present invention, the surface of the base layer may be subjected to surface treatment such as corona discharge treatment or plasma discharge treatment in advance. Further, on the surface of at least one of the pressure-sensitive adhesive layer and the base layer, an anchor layer may be formed using a resin having adhesion properties, or the like.

Examples of the resins used for the anchor layer include an ethylene/vinyl acetate copolymer, an ionomer, a block copolymer (e.g., styrene-based triblock copolymer such as SIS or SBS, and diblock copolymer), an ethylene/acrylic acid copolymer and an ethylene/methacrylic acid copolymer. One anchor layer may be formed, or two or more anchor layers may be formed.

When the anchor layer is formed, the method to form the anchor layer is not specifically restricted, and examples of the methods include a method wherein a solution containing the resin is applied onto the base layer to form the anchor layer and a method wherein a composition containing the resin or the like that becomes the anchor layer is thermally melted, and using the melt, the anchor layer is formed on the base layer surface by means of a T-die or the like.

When the anchor layer is formed, the resin that becomes the anchor layer and the pressure-sensitive adhesive composition of the present invention may be co-extruded to integrally laminate the anchor layer and the pressure-sensitive adhesive layer on the base layer surface, or the resin that becomes the anchor layer and the pressure-sensitive adhesive composition may be laminated in order on the base layer surface, and when the base layer is a plastic material layer, the plastic material that becomes the base layer, the resin that becomes the anchor layer and the pressure-sensitive adhesive composition may be co-extruded at a time.

The pressure-sensitive adhesive comprising the pressure-sensitive adhesive composition of the present invention can be used for various purposes. The pressure-sensitive adhesive layer composed of the pressure-sensitive adhesive composition can be used alone as a pressure-sensitive adhesive sheet, and also the laminate containing the pressure-sensitive adhesive layer can be applied for various purposes. For example, there can be mentioned pressure-sensitive adhesives and pressure-sensitive adhesive tapes or films for surface protection, masking, binding, packaging, office uses, labels, decoration/display, bonding, dicing tapes, sealing, corrosion prevention/waterproofing, medical/sanitary uses, prevention of glass scattering, electrical insulation, holding and fixing of electronic equipments, production of semiconductors, optical display films, pressure-sensitive adhesion type optical films, shielding from electromagnetic waves, and sealing materials of electric and electronic parts. Specific examples are given below.

The pressure-sensitive adhesives, the pressure-sensitive adhesive tapes or films, etc. for surface protection can be used for various materials, such as metals, plastics, rubbers and wood, and specifically, they can be used for surface protection of coating material surfaces, metals during deformation processing or deep drawing, and automobile parts or optical parts. Examples of the automobile parts include coated exterior plates, wheels, mirrors, windows, lights and light covers. Examples of the optical parts include various image display devices, such as liquid crystal display, organic EL display, plasma display and field emission display; optical disk constitutional films, such as polarizing film, polarizing plate, retardation plate, light guiding panel, diffusion plate and DVD; and fine coat faceplates for electronic/optical uses.

Examples of uses of the pressure-sensitive adhesives, the tapes, the films, etc. for masking include masking in manufacturing of printed wiring boards or flexible printed wiring boards; masking in a plating or soldering treatment for electronic equipments; and masking in manufacturing of vehicles such as automobiles, coating of vehicles and buildings, textile printing, and parting of civil engineering works.

Examples of uses for binding include binding of wire harnesses, electric wires, cables, fibers, pipes, coils, windings, steel materials, ducts, plastic bags, foods, vegetables and flowering plants.

Examples of uses for packaging include heavy material packaging, packaging for export, sealing of corrugated fiberboards and can sealing.

Examples of office uses include general use for office, and uses for sealing, mending of books, drawing and memorizing.

Examples of uses for labels include price display, merchandise display, tags, POP, stickers, stripes, nameplates, decoration and advertisement.

Examples of the labels include labels having, as bases, papers, such as paper, converted paper (paper having been subjected to aluminum deposition, aluminum laminating, vanishing, resin treatment or the like) and synthetic paper, and films made of cellophane, plastic materials, cloth, wood and metals. Specific examples of the bases include woodfree paper, art paper, cast-coated paper, thermal paper, foil paper, polyethylene terephthalate film, polyvinyl chloride film, OPP film, polylactic acid film, synthetic paper, thermal synthetic paper and overlaminate film. From the viewpoints of excellent transparency and weathering resistance, the pressure-sensitive adhesive composition of the present invention can be favorably used for labels using bases made of transparent materials among them. Further, because of little discoloration with time, the pressure-sensitive adhesive composition of the present invention can be favorably used for thermal labels having thermal paper or thermal synthetic paper as a base.

Examples of adherends for the labels include plastic products, such as plastic bottles and foamed plastic cases; paper or corrugated fiberboard products, such as corrugated fiberboard boxes; glass products, such as glass bottles; metal products; and other inorganic material products, such as ceramic products.

The label comprising a laminate containing a pressure-sensitive adhesive layer composed of the pressure-sensitive adhesive composition of the present invention rarely suffers adhesion acceleration during storage at a temperature that is a little higher than room temperature (e.g., 60° C.), and can be peeled without adhesive transfer after it is used. Moreover, it can be allowed to adhere to an adherend even at low temperatures (−40 to +10° C.), and even if it is stored at low temperatures (−40 to +10° C.), it does not come off.

Examples of uses for decoration/display include danger display seals, line tapes, wiring markings, after-glow luminous adhesive tapes and reflecting sheets.

Examples of the pressure-sensitive adhesion type optical films include optical films on at least a part or all of one or both surfaces of which, a pressure-sensitive adhesive layer has been formed, such as polarizing films, polarizing plates, retardation films, viewing angle enlarging films, luminance improving films, anti-reflection films, antiglare films, color filters, light guiding panels, diffusion films, prism sheets, electromagnetic wave shielding films, near infrared absorbing films, functional composite optical films, films for ITO lamination, impact resistance imparting films, and visibility improving films. In the pressure-sensitive adhesion type optical films, films in which a pressure-sensitive adhesive layer composed of the pressure-sensitive adhesive composition of the present invention has been formed on a protective film used for protecting a surface of the above optical film are included. The pressure-sensitive adhesion type optical films are favorably used in various image display devices, such as liquid crystal display devices, PDP, organic EL display devices, electronic paper, game machines and mobile terminals.

Examples of uses for electrical insulation include protective covering or insulation of coils, and layer insulation such as motor/transformer layer insulation.

Examples of uses for holding and fixing of electrical equipments include carrier tapes, packaging, fixing of cathode ray tubes, splicing and rib reinforcement.

Examples of uses for production of semiconductors include protection of silicon wafers.

Examples of uses for bonding include bonding in various adhesive fields, automobiles, electric trains and electric equipments, fixing of printing plates, bonding for construction, fixing of nameplates, bonding in general homes, and bonding to rough surfaces, irregular surfaces and curved surfaces.

Examples of uses for sealing include sealing for heat insulation, vibration isolation, waterproofing, moisture proofing, sound insulation and dust proofing.

Examples of uses for corrosion prevention/waterproofing include corrosion prevention for gas pipes and water pipes, corrosion prevention for large diameter pipes, and corrosion prevention for civil engineering buildings.

Examples of medical and sanitary uses include uses for percutaneous absorbent drugs, such as analgesic anti-inflammatory agents (plasters, poultices), ischemic heart disease remedies, female hormone replacement drugs, bronchodilators, cancer pain palliatives, stop smoking aids, plasters for cold, analgesic patches and keratin softening agents; uses for various tapes, such as first-aid plasters (containing germicide), surgical dressings/surgical tapes, plasters, hemostatic tapes, tapes for human waste disposal devices (artificial anus fixing tapes), tapes for stitching, antibacterial tapes, fixing tapings, self-adhesive bandages, adhesive tapes for oral mucosa, tapes for sporting, and depilatory tapes; uses for beauty, such as facial packs, moistening sheets for skin round the eye and keratin peel packs; cooling sheets, pocket body warmers, and uses for dust proofing, waterproofing and noxious insect capture.

Examples of uses for sealing materials of electronic/electric parts include liquid crystal monitors and solar cells.

EXAMPLES

The present invention is further described with reference to the following examples, but it should be construed that the present invention is in no way limited to those examples.

Various properties of the examples and the comparative examples were measured or evaluated by the following methods.

(1) Weight-Average Molecular Weight (Mw) and Molecular Weight Distribution (Mw/Mn) of Acrylic Bock Copolymers (I-1) to (I-18)

The weight-average molecular weight was determined as a molecular weight in terms of standard polystyrene by the use of gel permeation chromatography (abbreviated to GPC hereinafter).

Apparatus: GPC apparatus "HLC-8020" manufactured by Tosoh Corporation

Separation column: "TSKgel GMHXL", "G4000HXL" and "G5000HXL" manufactured by Tosoh Corporation were connected in series.

Eluent: tetrahydrofuran

Flow rate of eluent: 1.0 ml/min

Column temperature: 40° C.

Detection method: differential refractive index (RI)

(2) Content of Each Polymer Block in Acrylic Block Copolymers (I-1) to (I-18).

The content was determined by $^1$H-NMR measurement.

Apparatus: nuclear magnetic resonance apparatus "JNM-ECX400" manufactured by JEOL Ltd.

Solvent: deuterated chloroform

Signals in the vicinities of 3.6 ppm and 4.0 ppm in a $^1$H-NMR spectrum were assigned to an ester group (—O—CH$_3$) of a methyl methacrylate unit and an ester group (—O—C$\underline{H}_2$—CH$_2$—CH$_2$—CH$_3$ or —O—C$\underline{H}_2$—CH(—CH$_2$—CH$_3$)—CH$_2$—CH$_2$—CH$_2$—CH$_3$) of an acrylic acid ester unit, respectively, and a content of the copolymerization component was determined by a ratio of their integral values.

(3) Ratio of Monomers Constituting Polymer Block (B) in Acrylic Block Copolymers (I-1), (I-2), (I-7) to (I-12), and (I-14) to (I-16)

The ratio was determined by $^1$H-NMR measurement.

Apparatus: nuclear magnetic resonance apparatus "JNM-ECX400" manufactured by JEOL Ltd.

Solvent: deuterated chloroform

Signals in the vicinities of 4.1 ppm and 4.2 ppm in a $^1$H-NMR spectrum of a monomer mixture used in the polymerization for forming the polymer block (B) were assigned to an ester group (—O—C$\underline{H}_2$—CH$_2$—CH$_2$—CH$_3$) of n-butyl acrylate and an ester group (—O—C$\underline{H}_2$—CH(—CH$_2$—CH$_3$)—CH$_2$—CH$_2$—CH$_2$—CH$_3$) of 2-ethylhexyl acrylate, respectively, and a content (molar ratio) of each monomer was determined by a ratio of their integral values. This content was converted into a mass ratio on the basis of the molecular weight of the monomer unit, and this mass ratio was regarded as a mass ratio of the monomer constituting the polymer block (B).

(4) 180° Peel Strength

The 180° peel strength was measured in accordance with JIS Z0237. That is to say, the prepared pressure-sensitive adhesive tape having a thickness of 25 μm was cut into a width of 25 mm and a length of 100 mm, and the tape was allowed to adhere to a glass plate, a stainless steel (SUS304) plate (bright annealing treatment (referred to BA treatment) product), a poly(methyl methacrylate) (PMMA) plate or a polyethylene plate. After storing the sample at room temperature (after storage of 24 hours after lamination, unless otherwise stated), the tape was peeled at 23° C. and a rate of 300 mm/min in the direction of 180° to measure a peel strength. In the case where stick-slip occurred, the maximum value was regarded as a peel strength.

(5) Holding Power (SAFT)

The holding power was measured in accordance with ASTM D4498. That is to say, the prepared pressure-sensitive adhesive tape having a thickness of 25 μm (width 25 mm×length 25 mm) was allowed to adhere to a stainless steel (SUS304) plate (BA treatment product), then a load of 500 g was hung down, and the temperature was raised from 40° C. to 205° C. at a rate of 0.5° C./min to determine a temperature at which the load dropped.

(6) Holding Power (Creep)

The holding power was measured in accordance with JIS Z0237. That is to say, the prepared pressure-sensitive adhesive tape having a thickness of 25 μm (width 25 mm×length 25 mm) was allowed to adhere to a stainless steel (SUS304) plate (BA treatment product), then a load of 1 kg was hung down at a temperature of 90° C., and a drop time or a distance of shift after 1000 minutes was determined.

(7) Ball Tack

The ball tack was measured in accordance with JIS Z0237. That is to say, on a pressure-sensitive adhesive tape having a thickness of 25 μm, which had been placed so as to have an inclination angle of 30°, balls based on the ball tack method were rolled to determine a number of a maximum ball which had stopped on the pressure-sensitive adhesive tape.

(8) Value of Tan δ of Viscoelasticity

Block copolymers described in Tables 2 and 3 were each dissolved in toluene to prepare toluene solutions having a concentration of 30% by mass, and each solution was subjected to solution casting to obtain a sheet having a thickness of 1 mm. Then, dynamic viscoelasticity of the sheet in torsional vibration was measured under the following conditions to determine tan δ (loss shear modulus/storage shear modulus).

Apparatus: "Advanced Rheometric Expansion System" manufactured by Rheometric Scientific Ltd.

Parallel plate: diameter 8 mm

Vibration mode: torsional vibration

Number of vibrations: 6.28 rad/sec

Measuring temperature range: −50° C. to 250° C.

Heating rate: 3° C./min

Strain: 0.05% (−50° C. to −37° C.), 1.0% (−37° C. to −15° C.), 5.0% (−15° C. to 250° C.)

(9) Whitening Resistance

The prepared pressure-sensitive adhesive tape (50 mm×50 mm) having a thickness of 50 μm was allowed to adhere to a glass plate, and they were treated in an autoclave at a temperature of 60° C. and a pressure of 0.5 MPa for 30 minutes to measure a haze value (haze value 1). The tape with the glass plate was stored in a wet heat bath at a temperature of 85° C. and a humidity of 85% for 120 hours and taken out of the wet heat bath, and after 10 minutes, a haze value was measured (haze value 2). A pressure-sensitive adhesive tape having a difference between the haze value 1 and the haze value 2 (haze value 2-haze value 1) of not more than 2% was evaluated as AA, and a pressure-sensitive adhesive tape having a difference therebetween of more than 2% was evaluated as BB.

(10) Durability (Blister Resistance)

The prepared pressure-sensitive adhesive tape having a thickness of 50 μm was cut into a width of 25 mm and a length of 100 mm, and the tape was allowed to adhere to a polycarbonate plate (thickness: 1.5 mm). They were treated in an autoclave at a temperature of 60° C. and a pressure of 0.5 MPa for 30 minutes and then stored in a wet heat bath at a temperature of 60° C. and a humidity of 95% for 200 hours. Thereafter, presence of bubbles was observed using a scale magnifier (10 magnifications), and durability was evaluated based on the criteria described in Table 1.

TABLE 1

Durability (evaluation of blister resistance)

| | |
|---|---|
| No lifting, no peeling, and<br>number of bubbles of not more than 0.2 mmØ: 10/cm² or less<br>number of bubbles of not more than 5 mmØ: 1/20 cm² or less<br>bubbles of more than 5 mmØ: none | AA |
| Occurrence of lifting and peeling, or<br>number of bubbles of not more than 0.2 mmØ: 10/cm² or more<br>number of bubbles of not more than 5 mmØ: 2/20 cm² or more<br>bubbles of more than 5 mmØ: observed | BB |

(11) Melt Viscosity

A toluene solution having a concentration of 30% by mass was prepared in accordance with the formulation described in Table 8, and the solution was subjected to solution casting to obtain a sheet having a thickness of 1 mm. Using this sheet, a melt viscosity of the pressure-sensitive adhesive composition heated to 200° C. was measured by a Brookfield viscometer. As a spindle, that of No. 29 was used.

(12) Adhesion Acceleration (Change of Adhesive Force with Time)

The prepared pressure-sensitive adhesive tape having a thickness of 25 μm was cut into a width of 25 mm and a length of 100 mm, and the tape was allowed to adhere to a PMMA plate (manufactured by Sumika Acryl Co., Ltd., Sumipex E). The sample was stored at room temperature for 3 hours or 24 hours or 7 days, or at 60° C. for 24 hours or 7 days. Thereafter, the tape was peeled at 23° C. and a rate of 300 min/min in the direction of 180° in accordance with JIS Z0237, to measure a peel strength, and a ratio of adhesion acceleration was determined.

<<Synthesis Example 1>> [Synthesis of Acrylic Block Copolymer (I-1)]

(1) The interior of a 2-liter three-neck flask was purged with nitrogen, and then 868 g of toluene and 43.4 g of 1,2-dimethoxyethane were introduced at room temperature. Subsequently, 60.0 g of a toluene solution containing 40.2 mmol of isobutylbis(2,6-di-tert-butyl-4-methylphenoxy)aluminum was added, and 2.89 g of a mixed solution of cyclohexane and n-hexane containing 5.00 mmol of sec-butyllithium was further added. Subsequently, to this mixed solution, 35.9 g of methyl methacrylate was added. The color of the reaction solution was yellow at first, but after stirring for 60 minutes at room temperature, the reaction solution became colorless. At this time, the polymerization conversion ratio of the methyl methacrylate was not less than 99.9%. Next, the reaction mixed solution was cooled to −30° C., and 240 g of a mixture of n-butyl acrylate/2-ethylhexyl acrylate (mass ratio: 50/50) was dropwise added over a period of 2 hours. After the dropwise addition was completed, stirring was performed for 5 minutes at −30° C. At this time, the polymerization conversion ratio of the n-butyl acrylate/2-ethylhexyl acrylate mixture was not less than 99.9%. Subsequently, to the reaction mixed solution, 35.9 g of methyl methacrylate was added, and the mixture was stirred for one night at room temperature. Thereafter, 3.50 g of methanol was added to terminate the polymerization reaction. At this time, the polymerization conversion ratio of the methylmethacrylate was not less than 99.9%. The resulting reaction solution was poured into 15 kg of methanol to form a white precipitate. The white precipitate was recovered by filtration and dried to obtain 260 g of a block copolymer (referred to as an "acrylic block copolymer (I-1)" hereinafter).

(2) The acrylic block copolymer (I-1) obtained was subjected to $^1$H-NMR measurement and GPC measurement, and as a result, this copolymer was a triblock copolymer consisting of poly(methyl methacrylate)-poly(n-butyl acrylate/2-ethylhexyl acrylate)-poly(methyl methacrylate) and had a weight-average molecular weight (Mw) of 64,600, a number-average molecular weight (Mn) of 60,000 and a molecular weight distribution (Mw/Mn) of 1.08. The content of each polymer block in the acrylic block copolymer (I-1) was as follows: the content of the methyl methacrylate polymer block was 25.4% by mass, and the content of the (n-butyl acrylate/2-ethylhexyl acrylate) copolymer block was 74.6% by mass.

<<Synthesis Example 2>> [Synthesis of Acrylic Block Copolymer (I-2)]

(1) The interior of a 2-liter three-neck flask was purged with nitrogen, and then 868 g of toluene and 43.4 g of 1,2-dimethoxyethane were introduced at room temperature. Subsequently, 60.0 g of a toluene solution containing 40.2 mmol of isobutylbis(2,6-di-tert-butyl-4-methylphenoxy)aluminum was added, and 2.07 g of a mixed solution of cyclohexane and n-hexane containing 3.54 mmol of sec-butyllithium was further added. Subsequently, to this mixed solution, 36.6 g of methyl methacrylate was added. The color of the reaction solution was yellow at first, but after stirring for 60 minutes at room temperature, the reaction solution became colorless. At this time, the polymerization conversion ratio of the methyl methacrylate was not less than 99.9%. Next, the reaction mixed solution was cooled to −30° C., and 251.9 g of a mixture of n-butyl acrylate/2-ethylhexyl acrylate (mass ratio: 50/50) was dropwise added over a period of 2 hours. After the dropwise addition was completed, stirring was performed for 5 minutes at −30° C. At this time, the polymerization conversion ratio of the n-butyl acrylate/2-ethylhexyl acrylate mixture was not less than 99.9%. Subsequently, to the reaction mixed solution, 36.6 g of methyl methacrylate was added, and the mixture was stirred for one night at room temperature. Thereafter, 3.50 g of methanol was added to terminate the polymerization reaction. At this time, the polymerization conversion ratio of the methyl methacrylate was not less than 99.9%. The resulting reaction solution was poured into 15 kg of methanol to form a white precipitate. The white precipitate was recovered by filtration and dried to obtain 320 g of a block copolymer (referred to as an "acrylic block copolymer (I-2)" hereinafter).

(2) The acrylic block copolymer (I-2) obtained was subjected to $^1$H-NMR measurement and GPC measurement, and as a result, this copolymer was a triblock copolymer consisting of poly(methyl methacrylate)-poly(n-butyl acrylate/2-ethylhexyl acrylate)-poly(methyl methacrylate) and had a weight-average molecular weight (Mw) of 113,000, a number-average molecular weight (Mn) of 92,000 and a molecular weight distribution (Mw/Mn) of 1.23. The content of each polymer block in the acrylic block copolymer (I-2) was as follows: the content of the methyl methacrylate polymer block was 20.1% by mass, and the content of the (n-butyl acrylate/2-ethylhexyl acrylate) copolymer block was 79.9% by mass.

<<Synthesis Example 3>> [Synthesis of Acrylic Block Copolymer (I-3)]

(1) The interior of a 2-liter three-neck flask was purged with nitrogen, and then 868 g of toluene and 43.4 g of 1,2-dimethoxyethane were introduced at room temperature. Subsequently, 60.0 g of a toluene solution containing 40.2 mmol of isobutylbis(2,6-di-tert-butyl-4-methylphenoxy)aluminum was added, and 2.89 g of a mixed solution of cyclohexane and n-hexane containing 5.00 mmol of sec-butyllithium was further added. Subsequently, to this mixed solution, 35.9 g of methyl methacrylate was added. The color of the reaction solution was yellow at first, but after stirring for 60 minutes at room temperature, the reaction solution became colorless. At this time, the polymerization conversion ratio of the methyl methacrylate was not less than 99.9%. Next, the reaction mixed solution was cooled to −30° C., and 240 g of n-butyl acrylate was dropwise added over a period of 2 hours. After the dropwise addition was completed, stirring was performed for 5 minutes at −30° C. At this time, the polymerization conversion ratio of the n-butyl acrylate was not less than 99.9%. Subsequently, to the reaction mixed solution, 35.9 g of methyl methacrylate was added, and the mixture was stirred for one night at room temperature. Thereafter, 3.50 g of methanol was added to terminate the polymerization reaction. At this time, the polymerization conversion ratio of the methyl methacrylate was not less than 99.9%. The resulting reaction solution was poured into 15 kg of methanol to form a white precipitate. The white precipitate was recovered by filtration and dried to obtain 255 g of a block copolymer (referred to as an "acrylic block copolymer (I-3)" hereinafter).

(2) The acrylic block copolymer (I-3) obtained was subjected to $^1$H-NMR measurement and GPC measurement, and as a result, this copolymer was a triblock copolymer consisting of poly(methyl methacrylate)-poly(n-butyl acrylate)-poly(methyl methacrylate) and had a weight-average molecular weight (Mw) of 73,000, a number-average molecular weight (Mn) of 65,200 and a molecular weight distribution (Mw/Mn) of 1.12. The content of each polymer block in the acrylic block copolymer (I-3) was as follows: the content of the methyl methacrylate polymer block was 23.0% by mass, and the content of the n-butyl acrylate polymer block was 77.0% by mass.

<<Synthesis Example 4>> [Synthesis of Acrylic Block Copolymer (I-4)]

(1) The interior of a 2-liter three-neck flask was purged with nitrogen, and then 868 g of toluene and 43.4 g of 1,2-dimethoxyethane were introduced at room temperature. Subsequently, 60.0 g of a toluene solution containing 40.2 mmol of isobutylbis(2,6-di-tert-butyl-4-methylphenoxy)aluminum was added, and 2.07 g of a mixed solution of cyclohexane and n-hexane containing 3.54 mmol of sec-butyllithium was further added. Subsequently, to this mixed solution, 36.6 g of methyl methacrylate was added. The color of the reaction solution was yellow at first, but after stirring for 60 minutes at room temperature, the reaction solution became colorless. At this time, the polymerization conversion ratio of the methyl methacrylate was not less than 99.9%. Next, the reaction mixed solution was cooled to −30° C., and 251.9 g of n-butyl acrylate was dropwise added over a period of 2 hours. After the dropwise addition was completed, stirring was performed for 5 minutes at −30° C. At this time, the polymerization conversion ratio of the n-butyl acrylate was not less than 99.9%. Subsequently, to the reaction mixed solution, 36.6 g of methyl methacrylate was added, and the mixture was stirred for one night at room temperature. Thereafter, 3.50 g of methanol was added to terminate the polymerization reaction. At this time, the polymerization conversion ratio of the methyl methacrylate was not less than 99.9%. The resulting reaction solution was poured into 15 kg of methanol to form a white precipitate. The white precipitate was recovered by filtration and dried to obtain 310 g of a block copolymer (referred to as an "acrylic block copolymer (I-4)" hereinafter).

(2) The acrylic block copolymer (I-4) obtained was subjected to $^1$H-NMR measurement and GPC measurement, and as a result, this copolymer was a triblock copolymer consisting of poly(methyl methacrylate)-poly(n-butyl acrylate)-poly(methyl methacrylate) and had a weight-average molecular weight (Mw) of 110,000, a number-average molecular weight (Mn) of 92,000 and a molecular weight distribution (Mw/Mn) of 1.20. The content of each polymer block in the acrylic block copolymer (I-4) was as follows: the content of the methyl methacrylate polymer block was 22.5% by mass, and the content of the n-butyl acrylate polymer block was 77.5% by mass.

<<Synthesis Example 5>> [Synthesis of Acrylic Block Copolymer (I-5)]

(1) The interior of a 2-liter three-neck flask was purged with nitrogen, and then 868 g of toluene and 43.4 g of 1,2-dimethoxyethane were introduced at room temperature. Subsequently, 60.0 g of a toluene solution containing 40.2 mmol of isobutylbis(2,6-di-tert-butyl-4-methylphenoxy)aluminum was added, and 2.07 g of a mixed solution of cyclohexane and n-hexane containing 3.54 mmol of sec-butyllithium was further added. Subsequently, to this mixed solution, 36.6 g of methyl methacrylate was added. The color of the reaction solution was yellow at first, but after stirring for 60 minutes at room temperature, the reaction solution became colorless. At this time, the polymerization conversion ratio of the methyl methacrylate was not less than 99.9%. Next, the reaction mixed solution was cooled to −30° C., and 251.9 g of 2-ethylhexyl acrylate was dropwise added over a period of 2 hours. After the dropwise addition was completed, stirring was performed for 5 minutes at −30° C. At this time, the polymerization conversion ratio of the 2-ethylhexyl acrylate was not less than 99.9%. Subsequently, to the reaction mixed solution, 36.6 g of methyl methacrylate was added, and the mixture was stirred for one night at room temperature. Thereafter, 3.50 g of methanol was added to terminate the polymerization reaction. At this time, the polymerization conversion ratio of the methyl methacrylate was not less than 99.9%. The resulting reaction solution was poured into 15 kg of methanol to form a white precipitate. The white precipitate was recovered by filtration and dried to obtain 315 g of a block copolymer (referred to as an "acrylic block copolymer (I-5)" hereinafter).

(2) The acrylic block copolymer (I-5) obtained was subjected to $^1$H-NMR measurement and GPC measurement, and as a result, this copolymer was a triblock copolymer consisting of poly(methyl methacrylate)-poly(2-ethylhexyl acrylate)-poly(methyl methacrylate) and had a weight-average molecular weight (Mw) of 123,000, a number-average molecular weight (Mn) of 104,000 and a molecular weight distribution (Mw/Mn) of 1.19. The content of each polymer block in the acrylic block copolymer (I-5) was as follows: the content of the methyl methacrylate polymer block was 21.3% by mass, and the content of the 2-ethylhexyl acrylate polymer block was 78.7% by mass.

<<Synthesis Example 6>> [Synthesis of Acrylic Block Copolymer (I-6)]

(1) The interior of a 2-liter three-neck flask was purged with nitrogen, and then 868 g of toluene and 43.4 g of 1,2-dimethoxyethane were introduced at room temperature. Subsequently, 60.0 g of a toluene solution containing 40.2 mmol of isobutylbis(2,6-di-tert-butyl-4-methylphenoxy)aluminum was added, and 2.89 g of a mixed solution of cyclohexane and n-hexane containing 5.00 mmol of sec-butyllithium was further added. Subsequently, to this mixed solution, 35.9 g of methyl methacrylate was added. The color of the reaction solution was yellow at first, but after stirring for 60 minutes at room temperature, the reaction solution became colorless. At this time, the polymerization conversion ratio of the methyl methacrylate was not less than 99.9%. Next, the reaction mixed solution was cooled to −30° C., and 240 g of 2-ethylhexyl acrylate was dropwise added over a period of 2 hours. After the dropwise addition was completed, stirring was performed for 5 minutes at −30° C. At this time, the polymerization conversion ratio of the 2-ethylhexyl acrylate was not less than 99.9%. Subsequently, to the reaction mixed solution, 35.9 g of methyl methacrylate was added, and the mixture was stirred for one night at room temperature. Thereafter, 3.50 g of methanol was added to terminate the polymerization reaction. At this time, the polymerization conversion ratio of the methyl methacrylate was not less than 99.9%. The resulting reaction solution was poured into 15 kg of methanol to form a white precipitate. The white precipitate was recovered by filtration and dried to obtain 265 g of a block copolymer (referred to as an "acrylic block copolymer (I-6)" hereinafter).

(2) The acrylic block copolymer (I-6) obtained was subjected to $^1$H-NMR measurement and GPC measurement, and as a result, this copolymer was a triblock copolymer consisting of poly(methyl methacrylate)-poly(2-ethylhexyl acrylate)-poly(methyl methacrylate) and had a weight-average molecular weight (Mw) of 65,000, a number-average molecular weight (Mn) of 59,500 and a molecular weight distribution (Mw/Mn) of 1.09. The content of each polymer block in the acrylic block copolymer (I-6) was as follows: the content of the methyl methacrylate polymer block was 24.0% by mass, and the content of the 2-ethylhexyl acrylate polymer block was 76.0% by mass.

<<Synthesis Example 7>> [Synthesis of Acrylic Block Copolymer (I-7)]

An acrylic block copolymer (I-7) was obtained in the same manner as in Synthesis Example 1, except that the n-butyl acrylate/2-ethylhexyl acrylate mass ratio was changed to 90/10.

<<Synthesis Example 8>> [Synthesis of Acrylic Block Copolymer (I-8)]

An acrylic block copolymer (I-8) was obtained in the same manner as in Synthesis Example 1, except that the n-butyl acrylate/2-ethylhexyl acrylate mass ratio was changed to 10/90.

<<Synthesis Example 9>> [Synthesis of Acrylic Block Copolymer (I-9)]

An acrylic block copolymer (I-9) was obtained in the same manner as in Synthesis Example 1, except that the n-butyl acrylate/2-ethylhexyl acrylate mass ratio was changed to 60/40.

<<Synthesis Example 10>> [Synthesis of Acrylic Block Copolymer (I-10)]

An acrylic block copolymer (I-10) was obtained in the same manner as in Synthesis Example 1, except that the n-butyl acrylate/2-ethylhexyl acrylate mass ratio was changed to 35/65.

<<Synthesis Example 11>> [Synthesis of Acrylic Block Copolymer (I-11)]

An acrylic block copolymer (I-11) was obtained in the same manner as in Synthesis Example 1, except that the n-butyl acrylate/2-ethylhexyl acrylate mass ratio was changed to 25/75.

<<Synthesis Example 12>> [Synthesis of Acrylic Block Copolymer (I-12)]

An acrylic block copolymer (I-12) was obtained in the same manner as in Synthesis Example 1, except that the amount of methyl methacrylate added first was changed to 51.7 g, the amount of the mixture of n-butyl acrylate/2-ethylhexyl acrylate (mass ratio: 50/50) was changed to 547.4 g, and the amount of methyl methacrylate added for the second time was changed to 51.7 g.

<<Synthesis Example 13>> [Synthesis of Acrylic Block Copolymer (I-13)]

An acrylic block copolymer (I-13) was obtained in the same manner as in Synthesis Example 12, except that the n-butyl acrylate/2-ethylhexyl acrylate mass ratio was changed to 100/0.

<<Synthesis Example 14>> [Synthesis of Acrylic Block Copolymer (I-14)]

An acrylic block copolymer (I-14) was obtained in the same manner as in Synthesis Example 1, except that the amount of methyl methacrylate added first was changed to 24.6 g, the amount of the mixture of n-butyl acrylate/2-ethylhexyl acrylate (mass ratio: 50/50) was changed to 164.2 g, and the amount of methyl methacrylate added for the second time was changed to 24.6 g.

<<Synthesis Example 15>> [Synthesis of Acrylic Block Copolymer (I-15)]

An acrylic block copolymer (I-15) was obtained in the same manner as in Synthesis Example 1, except that the amount of methyl methacrylate added first was changed to 28.7 g, the amount of the mixture of n-butyl acrylate/2-ethylhexyl acrylate (mass ratio: 50/50) was changed to 193.7 g, and the amount of methyl methacrylate added for the second time was changed to 28.7 g.

<<Synthesis Example 16>> [Synthesis of Acrylic Block Copolymer (I-16)]

An acrylic block copolymer (I-16) was obtained in the same manner as in Synthesis Example 15, except that the n-butyl acrylate/2-ethylhexyl acrylate mass ratio was changed to 30/70.

<<Synthesis Example 17>> [Synthesis of Acrylic Block Copolymer (I-17)]

An acrylic block copolymer (I-17) was obtained in the same manner as in Synthesis Example 14, except that the n-butyl acrylate/2-ethylhexyl acrylate mass ratio was changed to 0/100.

<<Synthesis Example 18>> [Synthesis of Acrylic Block Copolymer (I-18)]

An acrylic block copolymer (I-18) was obtained in the same manner as in Synthesis Example 15, except that the n-butyl acrylate/2-ethylhexyl acrylate mass ratio was changed to 0/100.

Property values of the acrylic block copolymers (I-1) to (I-18) obtained in the above Synthesis Examples 1 to 18 are set forth in the following Table 2 and Table 3.

TABLE 2

| | Synthesis Example | | | | | | | | |
|---|---|---|---|---|---|---|---|---|---|
| | Synthesis Ex. 1 | Synthesis Ex. 2 | Synthesis Ex. 3 | Synthesis Ex. 4 | Synthesis Ex. 5 | Synthesis Ex. 6 | Synthesis Ex. 7 | Synthesis Ex. 8 | Synthesis Ex. 9 |
| Block copolymer | (I-1) | (I-2) | (I-3) | (I-4) | (I-5) | (I-6) | (I-7) | (I-8) | (I-9) |
| nBA/2EHA (mass ratio) | 50/50 | 50/50 | 100/0 | 100/0 | 0/100 | 0/100 | 90/10 | 10/90 | 60/40 |
| Mw of block copolymer | 64,600 | 113,000 | 73,000 | 110,000 | 123,000 | 65,000 | 67,000 | 66,000 | 68,000 |
| Mw/Mn of block copolymer | 1.08 | 1.23 | 1.12 | 120 | 1.19 | 1.09 | 1.12 | 1.11 | 1.10 |
| MMA content in block copolymer (% by mass) | 25.4 | 20.1 | 23.0 | 22.5 | 21.3 | 24.0 | 23.4 | 23.3 | 23.5 |
| tanδ maximum value (range of 50 to 100° C.) | $8.55 \times 10^{-2}$ | $8.66 \times 10^{-2}$ | $1.78 \times 10^{-1}$ | $1.92 \times 10^{-1}$ | $8.55 \times 10^{-2}$ | $3.85 \times 10^{-2}$ | no data | no data | no data |
| tanδ minimum value (range of 50 to 100° C.) | $4.44 \times 10^{-2}$ | $3.53 \times 10^{-2}$ | $1.45 \times 10^{-1}$ | $1.43 \times 10^{-1}$ | $3.10 \times 10^{-2}$ | $2.18 \times 10^{-2}$ | no data | no data | no data |

TABLE 3

| | Synthesis Example | | | | | | | | |
|---|---|---|---|---|---|---|---|---|---|
| | Synthesis Ex. 10 | Synthesis Ex. 11 | Synthesis Ex. 12 | Synthesis Ex. 13 | Synthesis Ex. 14 | Synthesis Ex. 15 | Synthesis Ex. 16 | Synthesis Ex. 17 | Synthesis Ex. 18 |
| Block copolymer | (I-10) | (I-11) | (I-12) | (I-13) | (I-14) | (I-15) | (I-16) | (I-17) | (I-18) |
| nBA/2EHA (mass ratio) | 35/65 | 25/75 | 50/50 | 100/0 | 50/50 | 50/50 | 30/70 | 0/100 | 0/100 |
| Mw of block copolymer | 66,000 | 65,000 | 155,000 | 160,000 | 46,000 | 56,000 | 53,000 | 42,000 | 52,000 |
| Mw/Mn of block copolymer | 1.10 | 1.10 | 1.25 | 1.28 | 1.06 | 1.08 | 1.06 | 1.07 | 1.07 |
| MMA content in block copolymer (% by mass) | 23.5 | 23.5 | 16.0 | 15.5 | 22.8 | 23.0 | 23.0 | 23.9 | 23.1 |
| tanδ maximum value (range of 50 to 100° C.) | no data | no data | no data | $1.66 \times 10^{-1}$ | $2.14 \times 10^{-1}$ | $1.22 \times 10^{-1}$ | $9.91 \times 10^{-2}$ | $1.01 \times 10^{-1}$ | no data |
| tanδ minimum value (range of 50 to 100° C.) | no data | no data | no data | $1.48 \times 10^{-1}$ | $6.96 \times 10^{-2}$ | $5.35 \times 10^{-2}$ | $3.90 \times 10^{-2}$ | $2.47 \times 10^{-2}$ | no data |

Examples 1 to 7, Comparative Example 1 to 8

The acrylic block copolymers (I-1) to (I-13) prepared in the above Synthesis Examples 1 to 13 and a tackifying resin (manufactured by Arakawa Chemical Industries, Ltd., Pinecrystal KE-311) were dissolved in toluene in the mass ratios shown in the following Table 4 and 5 to prepare toluene solutions each containing 35% by mass of a pressure-sensitive adhesive composition. Then, a polyethylene terephthalate film (Toyobo Ester Film E5000, thickness: 50 μm) was coated with the above toluene solution by a coater so that the thickness of the pressure-sensitive adhesive layer after drying might become 25 μm or 50 μm, and thereafter, the film was subjected to drying/heat treatment at 60° C. for 30 minutes to prepare a pressure-sensitive adhesive tape. When it was necessary to allow the prepared pressure-sensitive adhesive tape to adhere to an adherend in the evaluation of the tape, a roller of 2 kg was moved back and forth twice to allow the tape to adhere to the adherend at a rate of 10 mm/min, followed by evaluation.

Various properties of the resulting pressure-sensitive adhesive tapes were evaluated by the aforesaid methods. The results are as shown in the following Tables 4 to 6.

TABLE 4

| Composition | | Ex. 1 | Ex. 2 | Ex. 3 | Ex. 4 | Ex 5 | Ex. 6 | Ex. 7 |
|---|---|---|---|---|---|---|---|---|
| Composition | Block copolymer (I-1) | 100 | | | | | | |
| | Block copolymer (I-2) | | 100 | 100 | | | | |
| | Block copolymer (I-3) | | | | | | | |
| | Block copolymer (I-4) | | | | | | | |
| | Block copolymer (I-5) | | | | | | | |
| | Block copolymer (I-6) | | | | | | | |
| | Block copolymer (I-7) | | | | | | | |
| | Block copolymer (I-8) | | | | | | | |
| | Block copolymer (I-9) | | | | 100 | | | |
| | Block copolymer (I-10) | | | | | 100 | | |
| | Block copolymer (I-11) | | | | | | 100 | |
| | Block copolymer (I-12) | | | | | | | 100 |
| | Block copolymer (I-13) | | | | | | | |
| | Tackifying resin (KE311) | | | 35 | | | | |
| Adhesive force to glass (N/25 mm) | | 15.3 | 16.1 | 16.7 | 16.1 | 13.5 | 12.0 | 14.4 |
| Adhesive force to SUS (N/25 mm) | | 9.9 | 12.1 | 15.0 | 10.5 | 8.2 | 6.4 | 17.1 |
| SAFT (drop temperature: ° C.) | | 166 | 189 | 161 | 160 | 175 | 181 | 184 |
| Creep (distance of shift: mm) | | 0 | 0 | 0 | 0 | 0 | 0 | 0 |
| Ball tack | | 6 | 9 | 6 | 6 | 7 | 7 | 9 |
| Whitening resistance | | AA | AA | AA | AA | AA | AA | AA |
| Durability (blister resistance) | | AA | BB | BB | AA | AA | AA | AA |

TABLE 5

| | | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|
| Composition | Block copolymer (I-1) | | | | | | | | |
| | Block copolymer (I-2) | | | | | | | | |
| | Block copolymer (I-3) | 100 | | | | | | | 50 |
| | Block copolymer (I-4) | | 100 | | | | | | |
| | Block copolymer (I-5) | | | 100 | | | | | |
| | Block copolymer (I-6) | | | | 100 | | | | 50 |
| | Block copolymer (I-7) | | | | | 100 | | | |
| | Block copolymer (1-8) | | | | | | 100 | | |
| | Block copolymer (I-9) | | | | | | | | |
| | Block copolymer (I-10) | | | | | | | | |
| | Block copolymer (I-11) | | | | | | | | |
| | Block copolymer (I-12) | | | | | | | | |
| | Block copolymer (I-13) | | | | | | | 100 | |
| | Tackifying resin (KE311) | | | | | | | | |
| Adhesive force to glass (N/25 mm) | | 18.6 | 20.6 | 13.5 | 8.0 | 17.9 | 9.3 | 18.5 | 3.9 |
| Adhesive force to SUS (N/25 mm) | | 11.4 | 8.9 | 10.3 | 1.6 | 11.0 | 2.8 | 13.3 | 0.4 |
| SAFT (drop temperature: ° C.) | | 150 | 165 | >205 | 197 | 153 | 192 | 160 | 163 |
| Creep (distance of shift: mm) | | 0 | 0 | 0 | 0 | 0 | 0 | 0 | 0 |
| Ball tack | | 4 | 8 | 9 | 8 | 4 | 8 | 8 | 6 |
| Whitening resistance | | BB | BB | AA | AA | BB | AA | BB | AA |
| Durability (blister resistance) | | AA | BB | BB | BB | AA | BB | AA | AA |

TABLE 6

| Adhesive force to PMMA (N/25 mm) | Ex. 1 | Ex. 2 | Ex. 4 | Ex. 5 | Ex. 6 | Comp. Ex. 1 | Comp. Ex. 2 | Comp. Ex. 3 | Comp. Ex. 4 | Comp. Ex. 5 |
|---|---|---|---|---|---|---|---|---|---|---|
| 3 Hours at room temperature after lamination | 12.7 | 15.1 | 13.5 | 11.8 | 11.5 | 16.7 | 16.2 | 13.3 | 15.8 | 11.3 |
| 1 Day at room temperature after lamination | 12.7 | 15.2 | no data | no data | no data | 17.9 | 17.2 | 13.3 | no data | no data |
| 7 Days at room temperature after lamination | 13.5 | 15.4 | 14.3 | 12.2 | 11.7 | 19.3 | 18.4 | 13.1 | 18.0 | 11.4 |

TABLE 6-continued

| Adhesive force to PMMA (N/25 mm) | Ex. 1 | Ex. 2 | Ex. 4 | Ex. 5 | Ex. 6 | Comp. Ex. 1 | Comp. Ex. 2 | Comp. Ex. 3 | Comp. Ex. 4 | Comp. Ex. 5 |
|---|---|---|---|---|---|---|---|---|---|---|
| 7 Days at room temperature/3 hours at room temperature (%) | 106% | 102% | 106% | 103% | 102% | 116% | 114% | 98% | 114% | 101% |
| 1 Day at 60° C. after lamination | 16.6 | 15.1 | no data | no data | no data | 24.0 | 22.9 | 11.8 | no data | no data |
| 7 Days at 60° C. after lamination | 17.8 | 15.6 | no data | no data | no data | 24.9 | 23.5 | 11.7 | no data | no data |
| 7 Days at 60° C./3 hours at room temperature (%) | 140% | 103% | no data | no data | no data | 149% | 145% | 88% | no data | no data |

As can be seen from the results in Table 4 to Table 6, the pressure-sensitive adhesives of the present invention containing the acrylic block copolymers (I-1), (I-2), and (I-9) to (I-12) each having a polymer block (B) prepared from the mixture of a specific acrylic acid ester (1) and a specific acrylic acid ester (2) in a specific mass ratio were excellent in adhesive force to glass and SUS, holding power, tack and whitening resistance, rarely suffered adhesion acceleration and were excellent also in balance of them. In contrast with this, Comparative Examples 1 to 7 used the block copolymers (I-3) to (I-8) and (I-13) in which the polymer block corresponding to the polymer block (B) was composed of n-butyl acrylate only, 2-ethylhexyl acrylate only, or the mixture of n-butyl acrylate and 2-ethylhexyl acrylate which did not satisfy the mass ratio of the acrylic acid ester (1) to the acrylic acid ester (2) in the present invention, and they were inferior in adhesive force to glass and SUS, holding power, tack and whitening resistance, suffered marked adhesion acceleration and had poor balance of the pressure-sensitive adhesion properties. Comparative Example 8 using a mixture of an acrylic block copolymer in which the block corresponding to the polymer block (B) was composed of n-butyl acrylate only and an acrylic block copolymer in which the block corresponding to the polymer block (B) was composed of 2-ethylhexyl acrylate only was inferior in adhesive force and durability (blister resistance).

Examples 2 and 8 to 11, Comparative Example 2, 3 and 9 to 15

Pressure-sensitive adhesive tapes were prepared in the same manner as in Example 1 but in accordance with the formulation described in the following Table 7, and adhesion of the tapes to polyethylene was evaluated by the aforesaid method. The results are as shown in the following Table 7.

When Examples 2 and 8 to 11 were compared with Comparative Examples 2, 3 and 9 to 15, it was found from the results in Table 7 that the pressure sensitive adhesive compositions of the present invention tended to have excellent adhesion to polyethylene. Particularly when a tackifying resin was used in a large amount, improvement in adhesion to polyethylene proved to be remarkable in the present invention. On the other hand, in the case of the pressure-sensitive adhesive compositions of Comparative Examples 2 and 9 to 11 each using the block copolymer (I-4) in which the polymer block corresponding to the polymer block (B) was composed of n-butyl acrylate only, stick-slip was liable to occur by adding a tackifying resin in a given amount or more.

Examples 12 to 14, Comparative Example 16 and 17

Pressure-sensitive adhesive compositions of the blending ratios described in the following Table 8 and pressure-sensitive adhesive tapes were prepared in the same manner as in Example 1, and adhesion of the tapes to SUS and polyethylene and melt viscosity of the pressure-sensitive adhesive compositions at 200° C. were evaluated by the aforesaid methods. The results are as shown in the following Table 8.

TABLE 7

| | | Ex. 2 | Ex. 8 | Ex. 9 | Ex. 10 | Ex. 11 | Comp. Ex. 2 | Comp. Ex. 9 | Comp. Ex. 10 | Comp. Ex. 11 | Comp. Ex. 3 | Comp. Ex 12 | Comp. Ex. 13 | Comp. Ex 14 | Comp. Ex. 15 |
|---|---|---|---|---|---|---|---|---|---|---|---|---|---|---|---|
| Composition | Block copolymer (I-2) | 100 | 100 | 100 | 100 | 100 | | | | | | | | | |
| | Block copolymer (I-4) | | | | | | 100 | 100 | 100 | 100 | | | | | |
| | Block copolymer (I-5) | | | | | | | | | | 100 | 100 | 100 | 100 | 100 |
| | Tackifying resin (KE311) | 0 | 45 | 60 | 75 | 100 | 0 | 45 | 60 | 75 | 0 | 45 | 60 | 75 | 100 |
| Adhesive force to polyethylene (N/25 mm) | | 2.9 | 14.3 | 16.0 | 18.4 ss | 14.9 ss | 1.6 | 9.4 ss | 4.9 ss | 5.7 ss | 5.1 | 14.0 | 16.0 | 16.5 ss | 12.5 ss |

* ss means that slick-slip occurred in the peeling process.

TABLE 8

| | Ex. 12 | Ex. 13 | Ex. 14 | Comp. Ex. 16 | Comp. Ex. 17 |
|---|---|---|---|---|---|
| Composition Block copolymer (I-14) | 100 | | | | |
| Block copolymer (I-15) | | 100 | | | |
| Block copolymer (I-16) | | | 100 | | |
| Block copolymer (I-17) | | | | 100 | |
| Block copolymer (I-18) | | | | | 100 |
| Tackifying resin (KE311) | 35 | 35 | 35 | 35 | 35 |
| Adhesive force to SUS (N/25 mm) | 9.1 | 10.7 | 9.5 | 6.0 | 7.2 |
| Adhesive force to polyethylene (N/25 mm) | 6.8 | 8.4ss | 6.7 | 3.5 | 4.1 |
| 200° C. melt viscosity (mPa · s) | 2,600 | 9,900 | 19,000 | 13,000 | 87,000 |

* ss means that stick-slip occurred in the peeling process.

As can be seen from the results of Table 8, the pressure-sensitive adhesives of Examples 12 to 14 containing the block copolymers (I-14) to (I-16) which satisfied the definitions of the present invention and a tackifying resin exhibited higher adhesion to SUS and higher adhesion to polyethylene as compared with Comparative Example 16 and Comparative Example 17 using block copolymers which did not satisfy the definitions of the present invention. The pressure-sensitive adhesive compositions of Examples 12 to 14 have low melt viscosity, and therefore, they can be favorably used as adhesives which are used by being thermally melted.

INDUSTRIAL APPLICABILITY

The pressure-sensitive adhesive composition of the present invention exhibits excellent durability, whitening resistance, hot-melt processability, pressure-sensitive adhesion properties, holding power at high temperatures, heat resistance, weathering resistance, compatibility with tackifying resins, low-temperature properties and transparency, and rarely suffers adhesion acceleration. By the present invention, pressure-sensitive adhesives and pressure-sensitive adhesive products showing excellent pressure-sensitive adhesion performance over a long period of time even in the environment where they are exposed to UV rays or even under the use environmental conditions of high temperature and humidity or low temperature can be provided. The specific acrylic block copolymer for use in the present invention can be supplied in excellently handleable forms, such as pellets, and therefore, production efficiency for pressure-sensitive adhesives can be enhanced.

The invention claimed is:

1. A pressure-sensitive adhesive composition, comprising an acrylic triblock copolymer (I) in an amount of not less than 40% by mass based on the total amount of solid components of the pressure-sensitive adhesive composition, said acrylic triblock copolymer (I) comprising at least one polymer block (A) comprising methyl methacrylate units and at least one polymer block (B) comprising acrylic acid ester units,
wherein:
the acrylic triblock copolymer (I) is a triblock copolymer having a structure:
the polymer block (A)-the polymer block (B)-the polymer block (A);
a weight-average molecular weight (Mw) of the acrylic triblock copolymer (I) ranges from 64,600 to 68,000; and
a molecular weight distribution (Mw/Mn) of the acrylic triblock copolymer (I) ranges from 1.0 to 1.5;
the acrylic acid ester units are derived from
n-butyl acrylate as an acrylic acid ester (1), and
2-ethylhexyl acrylate as an acrylic acid ester (2);
a mass ratio (1)/(2) is from 60/40 to 25/75;
a content of the polymer block (A) in the acrylic triblock copolymer (I) is 22.0 to 25.4% by mass; and
a content of the polymer block (B) in the acrylic triblock copolymer (I) is 78.0 to 74.6% by mass.

2. The pressure-sensitive adhesive composition of claim 1, wherein a tan δ value of viscoelasticity of the acrylic triblock copolymer (I), as measured at a frequency of 1 Hz, is $1\times10^{-2}$ to $1\times10^{-1}$ in the range of 50 to 100° C.

3. The pressure-sensitive adhesive composition of claim 1, wherein:
a 180° peel strength against a glass plate at a peel rate of 300 mm/min is not less than 10 N/25 mm; and
when a structure of polyethylene terephthalate/pressure-sensitive adhesive layer/glass is aged in a constant temperature and humidity bath at 85° C. and 85% RH for 200 hours, a difference in haze value between before the aging and after the aging is not more than +2% wherein the haze value after aging is measured 10 minutes after removing from the bath.

4. A laminate, comprising a layer comprising the pressure-sensitive adhesive composition of claim 1, said layer being laminated on at least one base layer.

5. The laminate of claim 4, wherein a total light transmittance of the base layer is not less than 80%.

6. A label, comprising the laminate of claim 4.

7. An optical pressure-sensitive adhesive sheet, comprising a layer comprising the pressure-sensitive adhesive composition of claim 1.

8. The pressure-sensitive adhesive composition of claim 1, wherein:
a content of the polymer block (A) in the acrylic triblock copolymer (I) ranges from 23.5 to 25.4% by mass; and
a content of the polymer block (B) in the acrylic triblock copolymer (I) ranges from 76.5 to 74.6% by mass.

9. The pressure-sensitive adhesive composition of claim 1, further comprising at least one selected from the group consisting of a tackifying resin, a softener, a plasticizer, a heat stabilizer, a light stabilizer, an antistatic agent, a flame retardant, a blowing agent, a colorant, a dye, a refractive index adjusting agent, a filler and a curing agent.

10. The pressure-sensitive adhesive composition of claim 1, further comprising a tackifying resin.

11. The pressure-sensitive adhesive composition of claim 10, wherein the tackifying resin is at least one selected from the group consisting of a rosin-based resin, a terpene-based resin, a petroleum resin, a hydrogenated petroleum resin, a styrene-based resin, a coumarone-indene-based resin, a phenolic resin and a xylene resin.

12. The pressure-sensitive adhesive composition of claim 1, wherein the amount of the acrylic triblock copolymer (I)

ranges from 50 to 100% by mass based on the total amount of solid components of the pressure-sensitive adhesive composition.

13. The pressure-sensitive adhesive composition of claim 10, wherein an amount of the tackifying resin ranges from 1 to 100 parts by mass based on 100 parts by mass of the acrylic triblock copolymer (I).

* * * * *